US011087190B2

(12) United States Patent
Kanai et al.

(10) Patent No.: US 11,087,190 B2
(45) Date of Patent: Aug. 10, 2021

(54) INFORMATION PROCESSING APPARATUS, CONTROL METHOD THEREOF, AND STORAGE MEDIUM FOR CONTROLLING AN IMAGE FORMING APPARATUS

(71) Applicant: CANON KABUSHIKI KAISHA, Tokyo (JP)

(72) Inventors: Yasunori Kanai, Nagareyama (JP); Kenta Matsui, Moriya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/749,131

(22) Filed: Jan. 22, 2020

(65) Prior Publication Data

US 2020/0234094 A1 Jul. 23, 2020

(30) Foreign Application Priority Data

Jan. 23, 2019 (JP) ............................ JP2019-009775
Sep. 18, 2019 (JP) ............................ JP2019-169244

(51) Int. Cl.
*G06K 15/00* (2006.01)
*G06F 3/12* (2006.01)
*G06K 15/16* (2006.01)

(52) U.S. Cl.
CPC ....... *G06K 15/4065* (2013.01); *G06F 3/1286* (2013.01); *G06K 15/002* (2013.01); *G06K 15/16* (2013.01)

(58) Field of Classification Search
CPC .... G06K 15/4065; G06K 15/002; G06K 5/16; G06F 3/1286; G06F 3/1228;
(Continued)

(56) References Cited

U.S. PATENT DOCUMENTS 5,625,757 A * 4/1997 Kageyama ............ G06F 3/1259
358/1.14
5,630,062 A * 5/1997 Okutsu .................. G06F 3/121
718/100
(Continued)

FOREIGN PATENT DOCUMENTS

JP 2017113904 A 6/2017

OTHER PUBLICATIONS

Extended European Search Report issued by the European Patent Office dated Jun. 18, 2020 in corresponding EP Patent Application No. 20151626.7.

*Primary Examiner* — Juan M Guillermety
(74) *Attorney, Agent, or Firm* — Carter, DeLuca & Farrell LLP

(57) ABSTRACT

An information processing apparatus obtains capability information of a printing apparatus, wherein the capability information is including a predetermined text and a sheet type that the printing apparatus can use in printing; displays, in a display unit, a first option that the printing apparatus carries out printing for a sheet of a selected sheet type, based on the predetermined text included in the capability information, and displays a second option that the printing apparatus carries out printing for a sheet of the sheet type included in the capability information based on the sheet type included in the capability information; generates a print job including the option set through the screen; and sends the generated print job to the printing apparatus.

17 Claims, 21 Drawing Sheets

(58) Field of Classification Search
CPC .... G06F 3/1232; G06F 3/1255; G06F 3/1254; G06F 3/1285; G06F 3/1205; H04N 1/00411; H04N 1/00639; H04N 1/00466; H04N 1/0044; H04N 2201/0094
See application file for complete search history.

(56) References Cited

U.S. PATENT DOCUMENTS

| | | | | |
|---|---|---|---|---|
| 2002/0171857 | A1* | 11/2002 | Hisatomi | G06F 3/1206 358/1.13 |
| 2006/0221372 | A1* | 10/2006 | Onishi | G06F 3/1254 358/1.13 |
| 2012/0188574 | A1* | 7/2012 | Armstrong | G06F 3/1232 358/1.13 |
| 2013/0135668 | A1* | 5/2013 | Minagawa | G06F 3/1257 358/1.15 |
| 2013/0155464 | A1* | 6/2013 | Bearchell | G06K 15/181 358/1.15 |
| 2013/0271780 | A1* | 10/2013 | Sugiyama | G06F 3/1254 358/1.13 |
| 2016/0077770 | A1 | 3/2016 | Morita | |
| 2017/0262740 | A1* | 9/2017 | Matsui | G06K 15/1856 |
| 2017/0280005 | A1* | 9/2017 | Matsuda | H04N 1/00344 |
| 2018/0335985 | A1* | 11/2018 | Kimura | H04N 1/00411 |
| 2019/0130234 | A1* | 5/2019 | Kaneda | G06K 15/4065 |

* cited by examiner

FIG. 7A-1

● EXAMPLE OF CAPABILITY NOTIFICATION OF PRINTER

700

```
"Get-Printer-Attributes";
 Request =    (
          {
      "attributes-charset" = "utf-8";
      "attributes-natural-language" = en;
      "printer-uri" = "ipp://xxxx.local.:631/ipp/print";
   }
 );
 RequestId = 123456;
```

710

```
 Response =    (
   {
      "attributes-charset" = "utf-8";
      "attributes-natural-language" = "ja-jp";
   },
   {
      "charset-configured" = "utf-8";
      "charset-supported" = "utf-8";
      "color-mode-default" = color;
      "color-mode-supported" = (
          mono,
          color
      );
```

FIG. 7A-2

```
"color-supported" = 1;
"compression-supported" = none;
"copies-default" = 1;
"copies-supported" =          {
    lower = 1;
    upper = 9999;
};
"document-format-default" = "application/octet-stream";
"document-format-preferred" = "application/pdf";
<OMITTED>
ALT
(Case1)
"media-type-supported" = (
        "auto",
        "stationery",
        "stationery-lightweight",
        "stationery-heavyweight",
        );
```

711

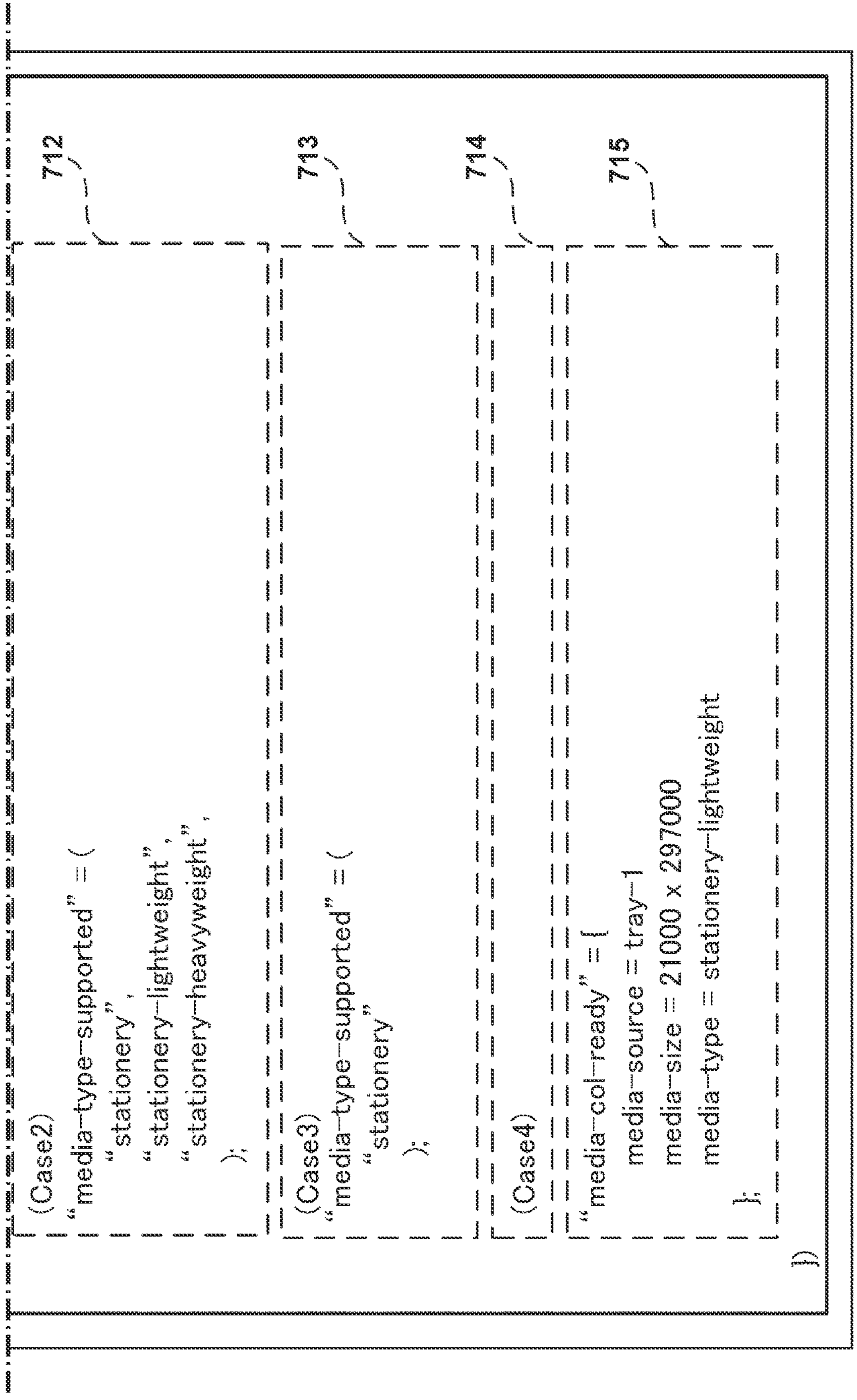
F I G. 7A-3
```
(Case2)
"media-type-supported" = (              — 712
    "stationery",
    "stationery-lightweight",
    "stationery-heavyweight",
);

(Case3)
"media-type-supported" = (              — 713
    "stationery",
);

(Case4)                                 — 714
"media-col-ready" = [                   — 715
    media-source = tray-1
    media-size = 21000 x 297000
    media-type = stationery-lightweight
];
)
```

FIG. 7B

● EXAMPLE OF PRINT JOB

720

```
"Create-Job" ;

OperationAttributes =    (
        {
    "attributes-charset" = "utf-8";
    "attributes-natural-language" = en;
    "printer-uri" = "ipp://xxxx.local.:631/ipp/print";
    "requesting-user-name" = "suzuki "

  }
);

JobAttributes = (
    "color-mode" = "color";
      "copies" = 1;

  <OMITTED>
  ALT
  (CaseA
      )
  "media-type" = "stationery";                    721

  (CaseB
      )
  "media-type" = "auto";                          722

  (CaseC
      )                                           723

  <OMITTED>
);
```

1201 1202

| MEDIA-TYPE-SUPPORTED | SHEET TYPE NAMES |
|---|---|
| AUTOMATIC | AUTOMATIC |
| STATIONERY | PLAIN PAPER |
| STATIONERY-LIGHTWEIGHT | THIN PAPER |

1501
< SHEET TYPE SELECTION
- ◉ AUTOMATIC
- ○ PLAIN PAPER
- ○ THIN PAPER
- ○ THICK PAPER

1502
< SHEET TYPE SELECTION
- ○ AUTOMATIC
- ○ PLAIN PAPER
- ◉ THIN PAPER
- ○ THICK PAPER

1503
< SHEET TYPE SELECTION
- ○ AUTOMATIC
- ◉ PLAIN PAPER
- ○ THIN PAPER
- ○ THICK PAPER

INFORMATION PROCESSING APPARATUS, CONTROL METHOD THEREOF, AND STORAGE MEDIUM FOR CONTROLLING AN IMAGE FORMING APPARATUS

BACKGROUND OF THE INVENTION

Field of the Invention

The present invention relates to an information processing apparatus, a control method thereof, and a storage medium.

Description of the Related Art

Printing apparatuses that receive print data from an information processing apparatus over a network and form an image on a sheet based on the received print data have been known for some time. Additionally, an information processing apparatus that generates print data to send to a printing apparatus using a printer driver (or a printing application) designed for using different individual printing apparatuses has also been known for some time.

In recent years, a technique is known in which print data is generated without using a printer driver (or printing application) designed for using individual printing apparatuses. Japanese Patent Laid-Open No. 2017-113904 proposes a print client that prints based on a network protocol for causing a printing apparatus to execute a print (the Internet Printing Protocol, or IPP). The print client implements the printing process by having the printing apparatus and the information processing apparatus communicate in accordance with an IPP communication procedure.

However, this conventional technique has the following issue. When the information processing apparatus generates print data using a generic printing service such as IPP, the information processing apparatus generates a printing settings screen based on capability information of the printing apparatus. For example, if the printing apparatus is capable of selecting the type of sheet for printing, i.e., plain paper, thin paper, or thick paper, the information processing apparatus displays, in accordance with the capability information of the printing apparatus, a settings screen for selecting the type of sheet, which enables the user to make a selection.

However, use cases for printing include not only cases where printing is carried out having designated the type of sheet, but also cases where printing is to be carried out using a sheet fed in the printing apparatus in advance, without designating the type of sheet.

There are some printing apparatuses which have functions for printing onto a sheet fed in a sheet feed unit, regardless of the type of sheet. However, past printing apparatuses have only communicated the type of sheet they can handle to the information processing apparatus. As such, the information processing apparatus cannot know whether or not the printing apparatus has a function for printing onto the sheet fed in the sheet feed unit regardless of the type of the sheet, and thus the user has not been able to make settings for using that function.

SUMMARY OF THE INVENTION

The present invention enables an information processing apparatus to configure for the use of that function in an information processing apparatus in a case where a printing apparatus is capable of printing onto any desired type of sheet.

One aspect of the present invention provides an information processing apparatus comprising: a memory device that stores a set of instructions; and at least one processor that executes the set of instructions to: obtain capability information of a printing apparatus, wherein the capability information is including a predetermined text and a sheet type that the printing apparatus can use in printing; display, in a display unit, a first option that the printing apparatus carries out printing for a sheet of a selected sheet type, based on the predetermined text included in the capability information, and display a second option that the printing apparatus carries out printing for a sheet of the sheet type included in the capability information based on the sheet type included in the capability information; generate a print job including the option set through the screen; and send the generated print job to the printing apparatus.

Another aspect of the present invention provides a control method for an information processing apparatus, the method comprising: obtaining capability information of a printing apparatus, wherein the capability information is including a predetermined text and a sheet type that the printing apparatus can use in printing; displaying a first option that the printing apparatus carries out printing for a sheet of a selected sheet type, based on the predetermined text included in the capability information, and display a second option that the printing apparatus carries out printing for a sheet of the sheet type included in the capability information based on the sheet type included in the capability information obtained in the obtaining; generating a print job including the option set through the screen; and sending the print job generated in the generating to the printing apparatus.

Still another aspect of the present invention provides a non-transitory computer-readable storage medium storing a program for causing a computer to execute each step of a control method for an information processing apparatus, the control method comprising: obtaining capability information of a printing apparatus, wherein the capability information is including a predetermined text and a sheet type that the printing apparatus can use in printing; displaying a first option that the printing apparatus carries out printing for a sheet of a selected sheet type, based on the predetermined text included in the capability information, and display a second option that the printing apparatus carries out printing for a sheet of the sheet type included in the capability information based on the sheet type included in the capability information obtained in the obtaining; generating a print job including the option set through the screen; and sending the print job generated in the generating to the printing apparatus.

Further features of the invention will be apparent from the following description of exemplary embodiments with reference to the attached drawings.

BRIEF DESCRIPTION OF THE DRAWINGS

FIGS. 7A-1 to 7A-3 are a diagram illustrating an example of a capability information notification and a print job, according to an embodiment.

FIG. 7B is a diagram illustrating an example of a capability information notification and a print job, according to an embodiment.

DESCRIPTION OF THE EMBODIMENTS

Preferred embodiments of the invention will now be described in detail with reference to the drawings. It should be noted that the relative arrangement of the components, the numerical expressions and numerical values set forth in these embodiments do not limit the scope of the invention unless it is specifically stated otherwise.

The printing apparatus according to the present embodiment can be applied as an image forming apparatus that forms images on a sheet using an electrophotographic technique, such as a printing apparatus (a printer), a copier, a multifunction peripheral (MFP), or a facsimile apparatus, as well as an image processing apparatus or an information processing apparatus. Note that a "multifunction peripheral" is an apparatus having two or more of a plurality of types of functions including a printing function, a scanning function, a copying function, and a facsimile function, for example. A case where the printing apparatus is a multifunction peripheral (MFP) will be described here. Additionally, the information processing apparatus according to the present embodiment can be applied in an apparatus capable of communicating directly or indirectly with the stated printing apparatus, such as a personal computer (PC), a tablet, a smartphone, or the like.

First Embodiment

System Configuration

Figure 1:
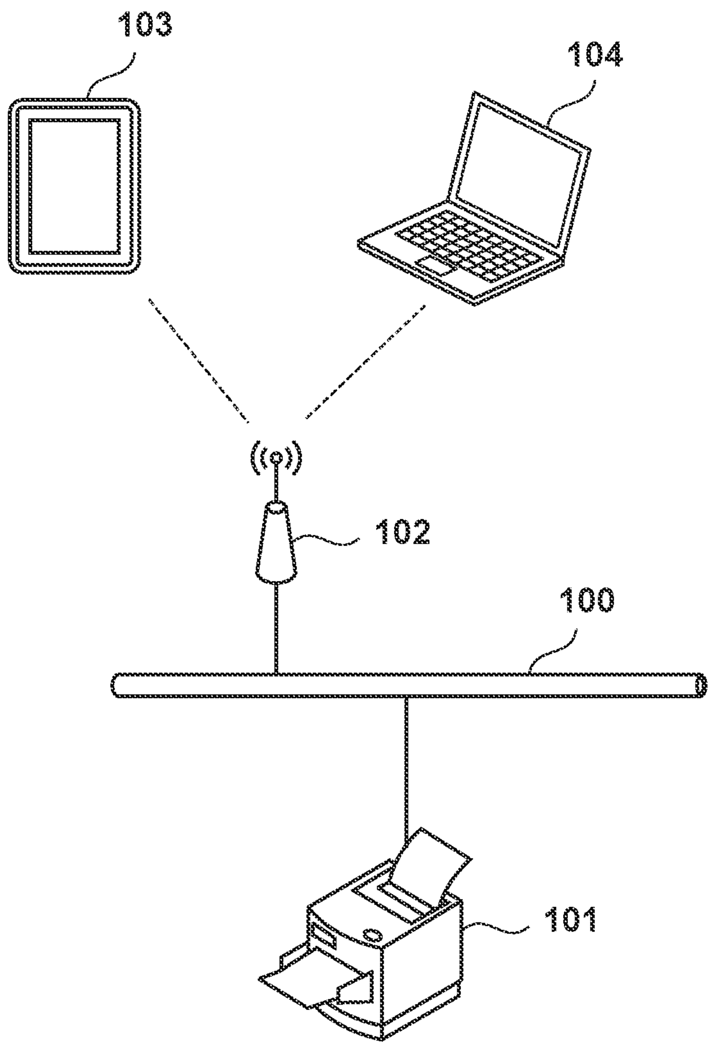
FIG. 1 is a schematic diagram illustrating a printing system according to an embodiment.

A first embodiment of the invention will be described hereinafter. First, an example of the configuration of a printing system according to the present embodiment will be described with reference to FIG. 1.

A printing apparatus 101 and an access point (AP) 102 are communicatively connected to each other over a Local Area Network (LAN) 100. Mobile terminals (information processing apparatuses) 103 and 104, which are tablets, laptop computers, or the like and serve as examples of information processing apparatuses, are also communicatively connected to the AP 102. In the following descriptions, the tablet 103, the laptop PC 104, and so on will be referred to generally as information processing apparatuses. The information processing apparatuses can communicate with the printing apparatus 101 over the LAN 100 via the AP 102. Although the present embodiment describes the foregoing exemplary configuration as an example of the printing system, the present invention is not limited thereto, as long as at least one information processing apparatus and a printing apparatus are communicatively connected over a network. Additionally, the network may be wireless or wired.

Hardware Configuration of Printing Apparatus

Figure 2:
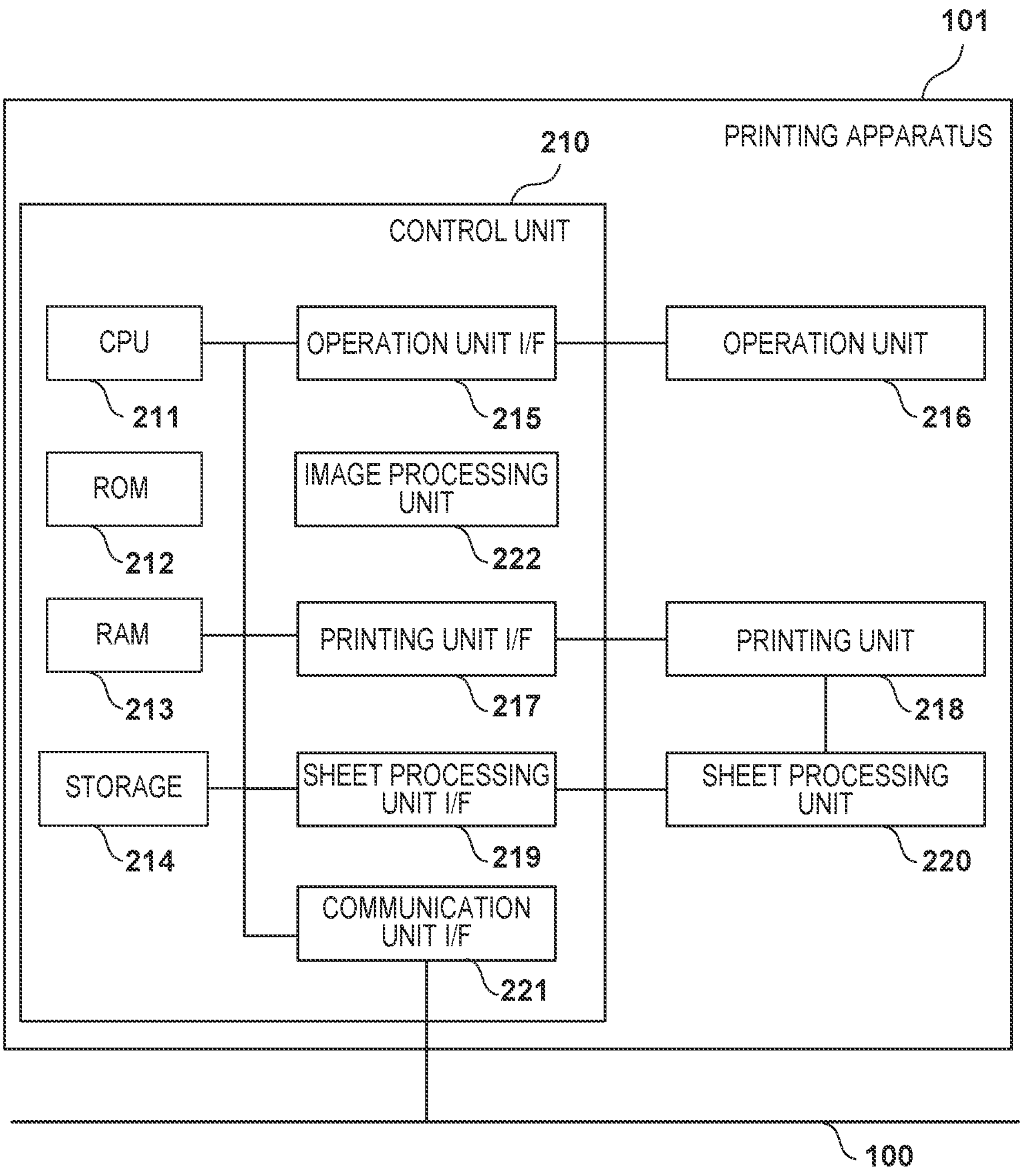
FIG. 2 is a hardware block diagram illustrating a printing apparatus according to an embodiment.

The hardware configuration of the printing apparatus 101 will be described next with reference to FIG. 2. The printing apparatus 101 has a printing function for printing images onto a sheet (a recording medium), and executes a printing process based on print data received over the network.

The printing apparatus 101 includes a control unit 210, an operation unit 216, a printing unit 218, and a sheet processing unit 220. The control unit 210 includes a CPU 211, ROM 212, RAM 213, storage 214, an operation unit interface (I/F) 215, an image processing unit 222, a printing unit I/F 217, a sheet processing unit I/F 219, and a communication unit I/F 221.

The control unit 210, which includes the CPU (Central Processing Unit) 211, comprehensively controls the overall operations of the printing apparatus 101. The CPU 211 controls printing by loading programs stored in the ROM (Read Only Memory) 212 or the storage 214 into the RAM 213 and executing those programs. The ROM 212 stores control programs, a boot program, and the like that can be executed by the CPU 211. The RAM (Random Access Memory) 213 is the main storage memory of the CPU 211, and is used as a work area or a temporary storage region for loading various types of control programs. The storage 214 stores print data, image data, various types of programs, and various types of settings information. Although the present embodiment assumes that the storage 214 is an auxiliary storage device such as a Hard Disk Drive (HDD) or the like, non-volatile memory such as a Solid State Drive (SSD) may be used as well.

Note also that with the printing apparatus 101 according to the present embodiment, it is assumed that the single CPU 211 executes the respective processes in the flowcharts described later using a single unit of memory (the RAM 213), but a different format may be used as well. For example, the respective processes in the flowcharts described later may be executed with a plurality of CPUs, RAM, ROM, and storage operating in tandem. Some of the processes may be executed using hardware circuits such as an Application Specific Integrated Circuit (ASIC), a Field-Programmable Gate Array (FPGA), or the like.

The operation unit I/F 215 is an interface connecting the operation unit 216 to the control unit 210. The operation unit 216 includes a display unit, which has touch panel functionality, various types of physical keys, and the like, and functions as a display unit that displays information, an accepting unit that accepts user instructions, and the like. The printing unit I/F 217 connects the printing unit (a printer engine) 218 to the control unit 210. Image data, which has been generated by analyzing a print job received from an information processing apparatus, is transferred from the control unit 210 to the printing unit 218 via the printing unit I/F 217. The printing unit 218 receives control commands and a print job to be printed via the control unit 210, and based on that print job, prints an image onto a sheet supplied from a sheet feed cassette. The printing unit 218 according to the present embodiment supports at least one type of sheet that can be supplied from the sheet feed cassette. Capability information indicating the types of sheet the printing unit 218 can supply is communicated to the control unit 210 via the printing unit I/F 217 in advance (e.g., when the printing apparatus 101 is started up), and is stored in the storage 214 or the RAM 213.

Note that the printing method of the printing unit 218 may be an electrophotographic method, or may be an ink jet method. Another printing method can be employed as well, such as a thermal transfer method. The control unit 210 is also connected to the LAN 100 via the communication unit I/F 221. The communication unit I/F 221 sends image data, information, and the like to the information processing apparatuses on the LAN 100, receives print jobs, information, and the like from the information processing apparatuses on the LAN 100, and so on.

The image processing unit 222 has a Raster Image Processor (RIP) function that expands a print job received over the LAN 100 and generates image data to be used in printing. The image processing unit 222 can also carry out resolution conversion, correction processing, and the like on the image data obtained by expanding the print job. Although the present embodiment assumes that the image processing unit 222 is realized by a hardware circuit (an ASIC, an FPGA, or the like), the configuration is not limited thereto. For example, the printing apparatus 101 may further include a processor for use in image processing, and the image processing, the process for expansion into print data, and the like may be realized by that processor executing an image processing program. In this case, the flowcharts described later are assumed to be realized by the processor and the CPU 211 working in tandem. Furthermore, the configuration may be such that the image processing, the process for expansion into print data, and the like are carried out by the CPU 211 executing a program for carrying out image processing. The image processing may also be carried out by combining any of these.

The sheet processing unit I/F 219 connects the control unit 210 to the sheet processing unit 220. The sheet processing unit 220 receives control commands from the control unit 210, and in accordance with those control commands, carries out post-processing on the sheet that has been printed onto by the printing unit 218. The post-processing includes aligning a plurality of sheets, punching holes in sheets, binding a plurality of sheets, and so on, for example.

Software Configuration of Printing Apparatus

Figure 3:
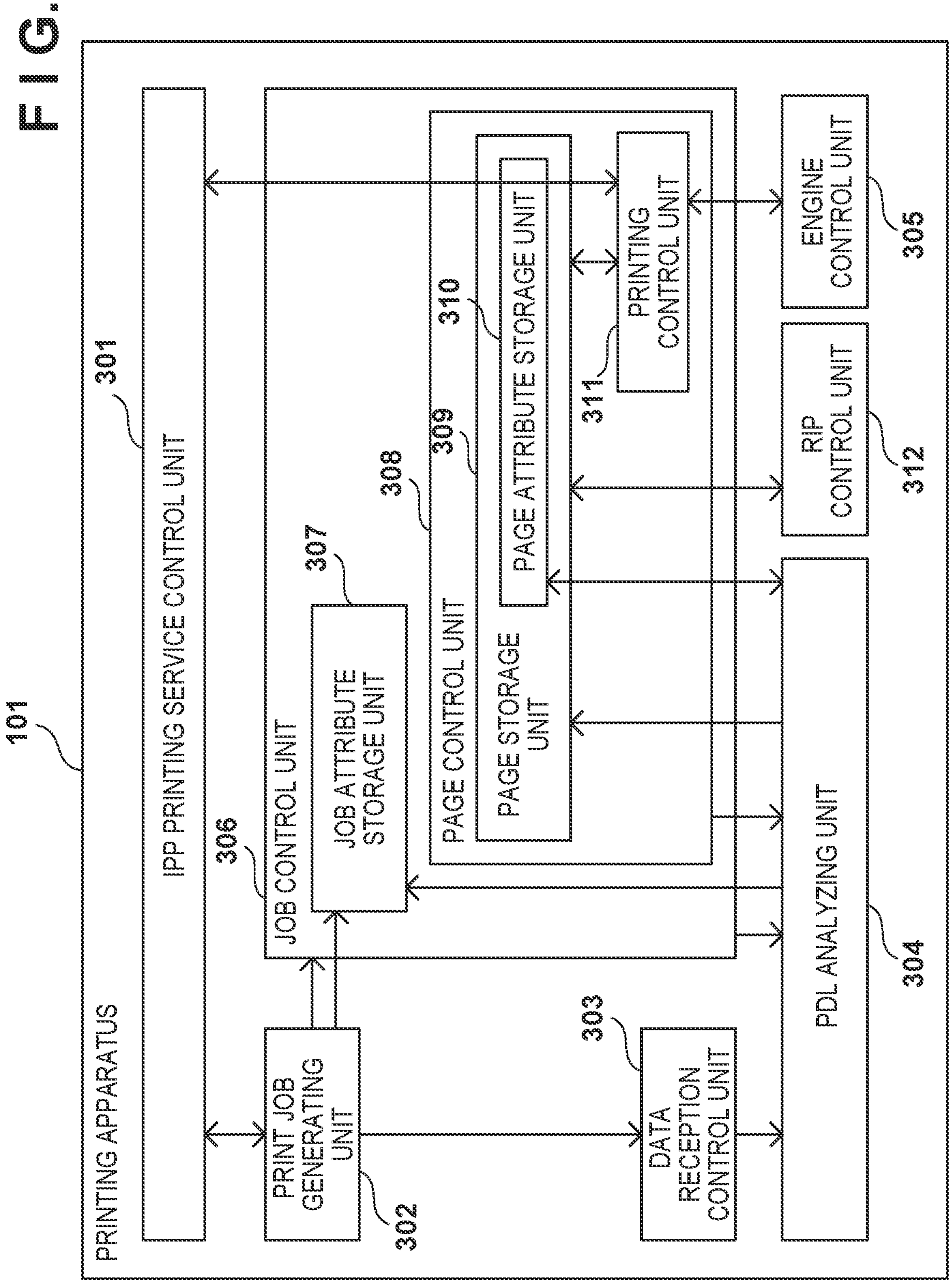
FIG. 3 is a software block diagram illustrating the printing apparatus according to an embodiment.

The software configuration of the printing apparatus 101 according to the present embodiment will be described next with reference to FIG. 3. Note that the present embodiment assumes that the function blocks illustrated in FIG. 3 are realized by the CPU 211 executing programs loaded into the RAM 213.

An IPP printing service control unit 301 obtains the capability information of the printing apparatus from an engine control unit 305 via a printing control unit 311. In the present embodiment, capability information indicating the type of sheet that can be supplied from the sheet feed cassette of the printing apparatus 101 is obtained from the engine control unit 305. Accordingly, it is desirable that the engine control unit 305 hold that capability information in advance, when the apparatus is shipped as a product. However, the configuration may be such that the capability information is updated later when optional devices are connected, the software is updated, and so on. The capability information will be described in detail later.

Processing carried out when a print job is received from an external device will be described next. Upon receiving a print job based on the IPP standard over the network from an information processing apparatus (the tablet 103, the laptop PC 104, or the like), the IPP printing service control unit 301 passes the print job to a print job generating unit 302.

Having received the print job, which itself was received from the information processing apparatus, via the IPP printing service control unit 301, the print job generating unit 302 writes the print job into a data reception control unit 303, and also requests a job control unit 306 to register the print job as a new job and commence the printing process. The print job generating unit 302 then passes print settings information, which is to be applied to that print job, to a job attribute storage unit 307.

The data reception control unit 303 is a buffer region for print jobs received by the print job generating unit 302, and temporarily stores each print job in the storage 214. When the job control unit 306 instructs a PDL analyzing unit 304 to carry out a PDL analysis process on the print job, the PDL analyzing unit 304 makes a request for that print job to the data reception control unit 303. In response, the data reception control unit 303 passes the data of that print job to the PDL analyzing unit 304. The PDL analyzing unit 304 generates intermediate rendering data and page attributes in accordance with the PDL language specifications, and saves the results of this processing in a page storage unit 309 and a page attribute storage unit 310. The page data created by the PDL analyzing unit 304 is saved in the page storage unit 309 and the page attribute storage unit 310 on a page-by-page basis.

The attributes stored in the job attribute storage unit 307 include "sheet type", "number of copies", "Nup (collective printing)", "printed side (single-sided/double-sided) settings", "color/black-and-white mode", "finishing settings", and the like, which are set as IPP job attributes. These are all managed in the job attribute storage unit 307 in association with job IDs.

A page control unit 308 controls page analysis processing carried out by the PDL analyzing unit 304, RIP processing carried out by a RIP control unit 312, and printing control processing carried out by the printing control unit 311. The printing control unit 311 obtains image data already subjected to the RIP processing from the page storage unit 309, separates the data into CMYK colors, and transfers the data to the engine control unit 305. The engine control unit 305 receives the C, M, Y, and K image data from the printing control unit 311 in units of pages, and executes the printing process for each page by controlling the printing unit 218.

Hardware Configuration of Information Processing Apparatus

Figure 4:
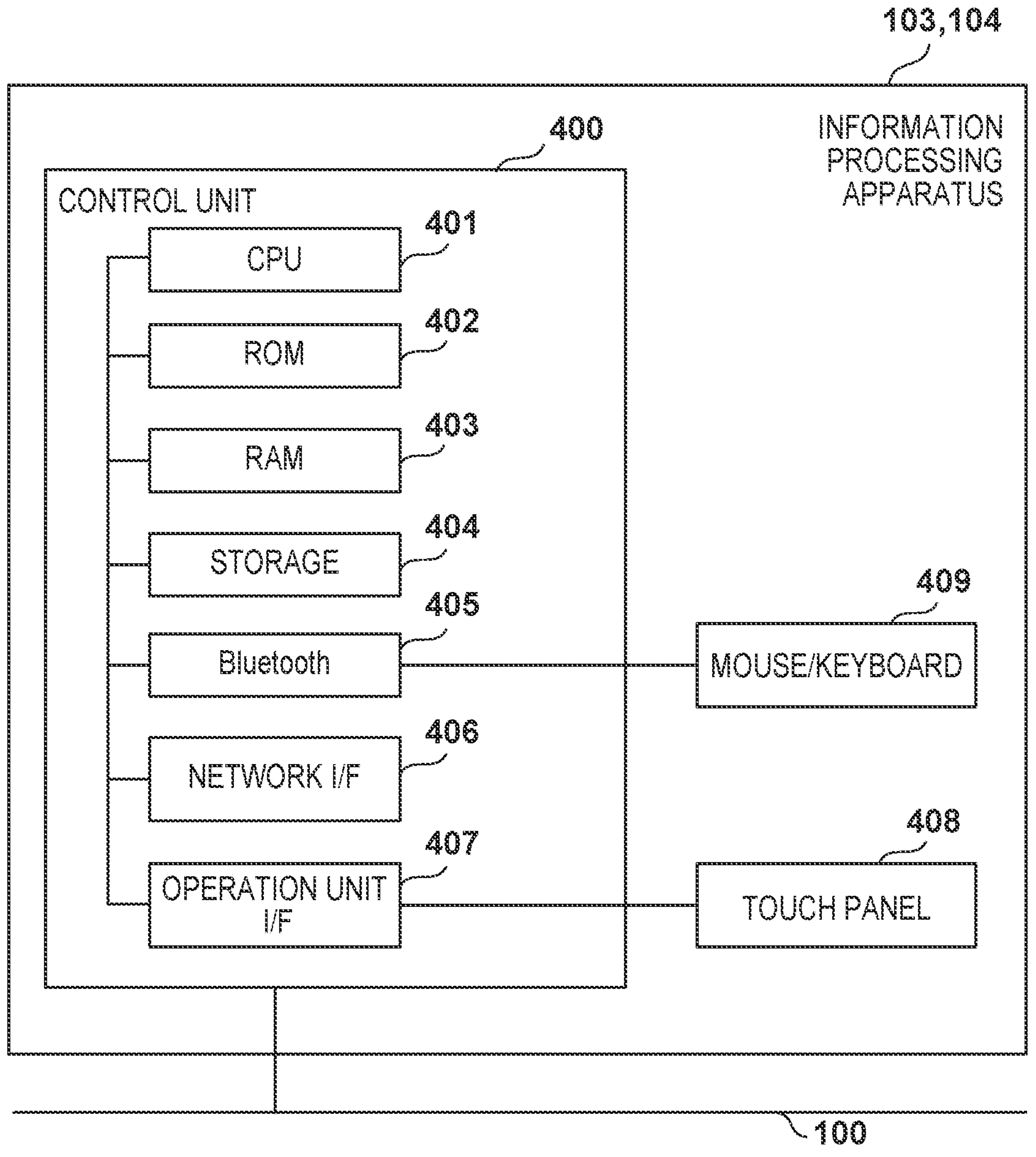
FIG. 4 is a hardware block diagram illustrating an information processing apparatus according to an embodiment.

The hardware configuration of the information processing apparatuses according to the present embodiment (the tablet 103, the laptop PC 104, and so on) will be described next with reference to FIG. 4. The information processing apparatus according to the present embodiment includes a control unit 400, a mouse/keyboard 409, and a touch panel 408. The control unit 400 includes a CPU 401, ROM 402, RAM 403, storage 404, Bluetooth (registered trademark) 405, a network I/F 406, and an operation unit I/F 407.

The control unit 400, which includes the CPU (Central Processing Unit) 401, comprehensively controls the overall operations of the information processing apparatus. The CPU 401 carries out computational processes by loading programs stored in the ROM (Read Only Memory) 402 or the storage 404 into the RAM 403 and executing those programs. The ROM 402 stores control programs, a boot program, and the like that can be executed by the CPU 401. The RAM (Random Access Memory) 403 is the main storage memory of the CPU 401, and is used as a work area or a temporary storage region for loading various types of control programs. The storage 404 stores application data, print data, various types of programs, and various types of settings information. Although the present embodiment assumes that a Solid State Drive (SSD) is used as the storage 404, an HDD or the like may be used instead.

Bluetooth 405 is for connecting and using the mouse/keyboard 409, and the network I/F 406 is for connecting to a wireless LAN or the like. The touch panel 408, which is connected via the operation unit I/F 407, renders images in a liquid-crystal screen and detects touch inputs made by a user. Note also that with the information processing apparatuses 103 and 104 according to the present embodiment, it is assumed that the single CPU 401 executes the respective processes in the flowcharts described later using a single unit of memory (the RAM 403), but a different format may be used as well. For example, the respective processes in the flowcharts described later may be executed with a plurality of CPUs, RAM, ROM, and storage operating in tandem. The operation unit I/F 407 connects the touch panel 408 to the control unit 400. The touch panel 408 includes a display unit, which has touch functionality, and functions as a display unit that displays information, an accepting unit that accepts user instructions, and the like. The control unit 400 connects to the AP 102 via the network I/F 406.

Software Configuration of Information Processing Apparatus

Figure 5:
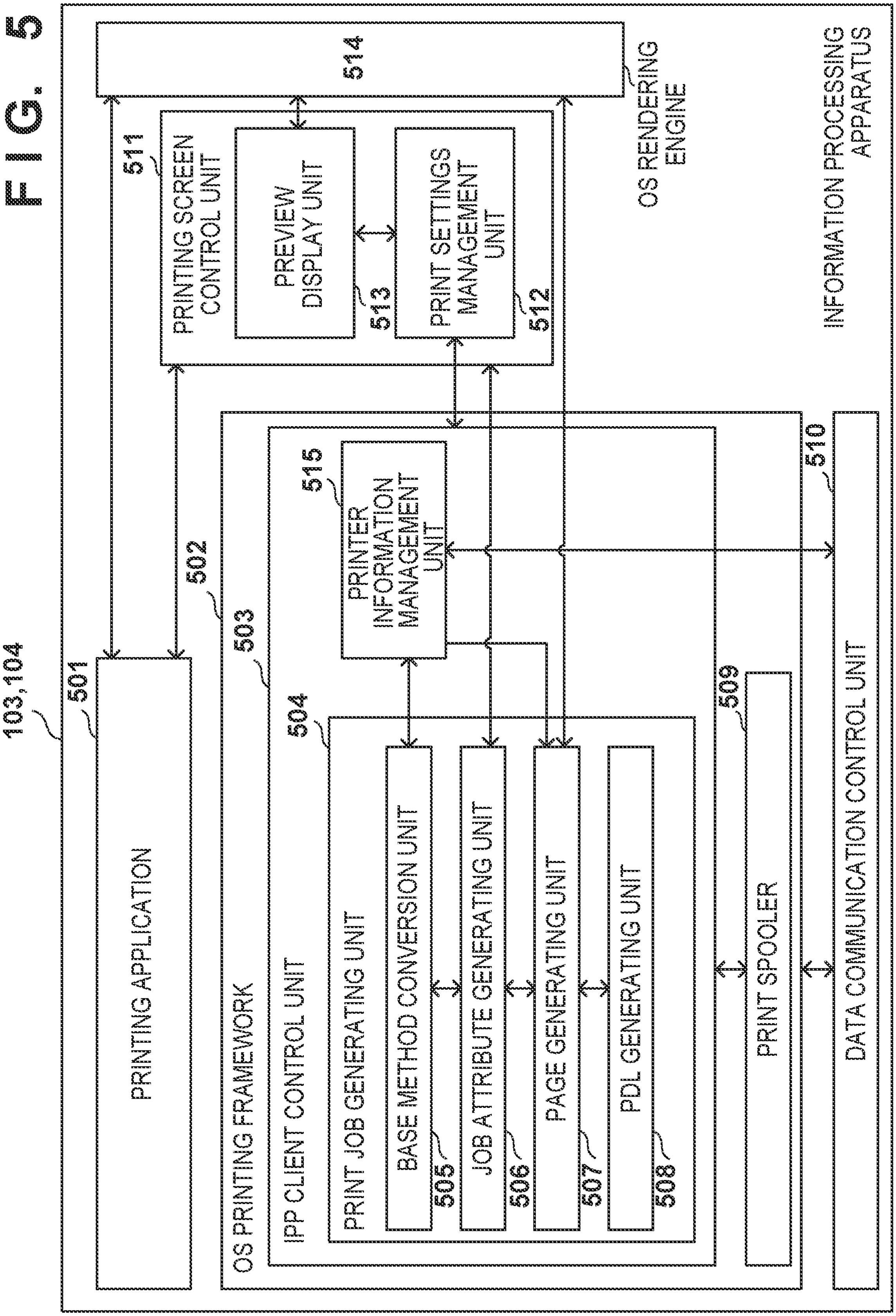
FIG. 5 is a software block diagram illustrating the information processing apparatus according to an embodiment.

The software configuration of the information processing apparatuses according to the present embodiment will be described next with reference to FIG. 5. It is assumed that the function blocks illustrated in FIG. 5 are realized by the CPU 401 executing programs loaded into the RAM 403.

A printing application 501 is an application that runs in the information processing apparatus, and provides typical application functionality, such as word processing or spreadsheets, to the user. Each application not only renders a GUI for user operations, but also generates data for printing, through an OS rendering engine 514 provided by an operating system running in the information processing apparatus.

When the user calls a printing function through the application, the application calls a printing screen control unit 511. The printing application 501 generates page data for printing through the OS rendering engine 514, and each piece of page data generated by the OS rendering engine 514 is passed to a preview display unit 513 before printing is started, and to a page generating unit 507 after printing has been started. The printing screen control unit 511 is constituted by a print settings management unit 512 and the preview display unit 513. The print settings management unit 512 obtains the capability information of each of printing apparatuses from a printer information management unit 515, and generates a UI screen for print settings based on the capabilities of each printing apparatus. The capability information obtained here also includes capability information pertaining to the type of sheets the printing apparatus 101 can supply. If the printing apparatus 101 supports sheet types in the print settings, a UI screen for sheet type settings is displayed (8200, 8300, and 8400).

An OS printing framework 502 is constituted by an IPP client control unit 503 and a print spooler 509. The IPP client control unit 503 is constituted by a print job generating unit 504, which generates print data for a print job in accordance with instructions from the printing screen control unit 511, and the printer information management unit 515, which holds the capability information of the printing apparatus 101 obtained from the printing apparatus 101. The print spooler 509 transfers the print jobs generated by the IPP client control unit 503 to the printing apparatus 101 in order, via a data communication control unit 510. The printer information management unit 515 obtains capability information of the printer from the printing apparatus 101, through the data communication control unit 510. The obtained information is also supplied to the printing screen control unit 511, a base method conversion unit 505, and so on.

A job attribute generating unit 506 and the page generating unit 507 commence processing in response to an instruction to generate print data received from the printing screen control unit 511. The job attribute generating unit 506 generates job settings information for an IPP job in accordance with instructions from the print settings management unit 512. The page generating unit 507 obtains the page data generated by the OS rendering engine 514 according to the page order, operates in tandem with a PDL generating unit 508 to convert that page data into PDL language which can be processed by the printing apparatus 101, and sends the resulting data. The PDL format which can be interpreted by the printing apparatus 101 is obtained from the printer information management unit 515.

Printing Sequence

Figure 6:
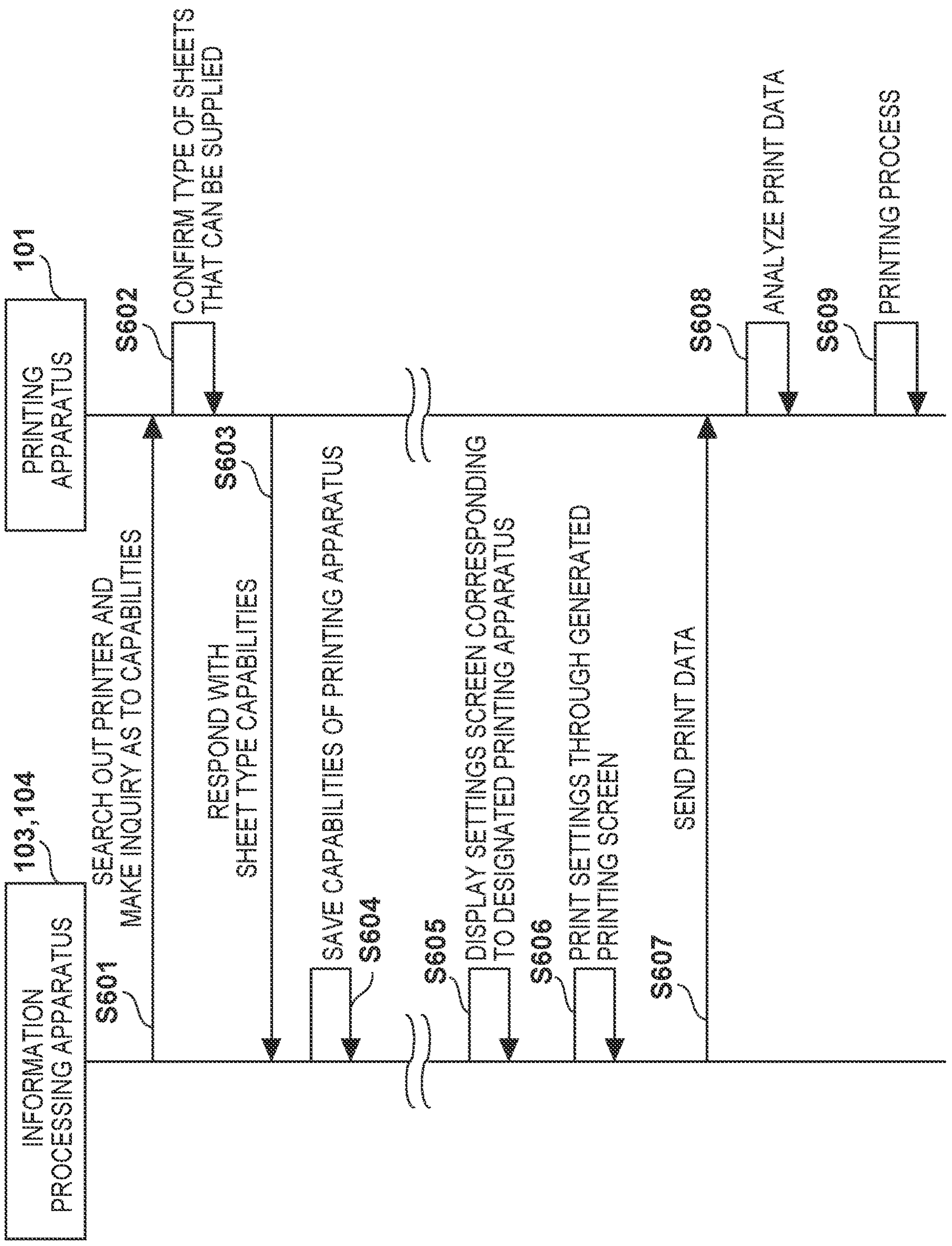
FIG. 6 is a sequence chart illustrating a sequence from searching for a printing apparatus to printing, according to an embodiment.

A printing sequence according to the present embodiment, spanning from the searching/registration of the information processing apparatuses and the printing apparatus 101 to the end of printing, will be described next with reference to FIG. 6. With respect to the processing carried out by the information processing apparatus as described below, the processing may be carried out by either of the tablet 103 and the laptop PC 104 as described above, or may be carried out by another information processing apparatus.

In step S601, the information processing apparatus searches out the printing apparatus 101 and makes an inquiry as to the capabilities of the printing apparatus (the capability information). Then, the printing apparatus 101 confirms the type of sheets that can be supplied in step S602, and communicates the capability information, which includes information pertaining to the type of sheets, in step S603. The present embodiment will primarily describe control in which the "type of sheets" serves as a predetermined printing item. This is not intended to limit the present invention, however, and the control described hereinafter may also be applied to other printing items as well.

Next, in step S604, the information processing apparatus receives the capability information communicated from the printing apparatus 101, and saves that information in the printer information management unit 515. Then, in step S605, when the user calls the printing function from an application in the information processing apparatus, the information processing apparatus displays the printing screen for the selected printing apparatus 101. If information pertaining to a plurality of printing apparatuses has been obtained, the user may be allowed to select one of the plurality of printing apparatuses. Here, if the printing apparatus 101 supports sheet types, the information processing apparatus displays a screen for selecting the sheet type. In step S606, the information processing apparatus receives the print settings from the user, and when a print button is selected, the process moves to step S607, where the IPP client control unit 503 generates the print data and the print job attributes, and then sends the print data to the printing apparatus 101. The printing apparatus 101 analyzes the print data in step S608, and executes the printing process in step S609.

Capability Request and Print Job

A capability request made from the information processing apparatus to the printing apparatus 101, and the print job, according to the present embodiment will be described next with reference to FIGS. 7A and 7B. 700 indicates an example of the capability request issued from the information processing apparatus to the printing apparatus 101 in the aforementioned step S601. 710 indicates an example of the capability information sent from the printing apparatus 101 to the information processing apparatus in step S603 in response to the capability request. 720 indicates an example of a job ticket for the print job of step S607, generated by the information processing apparatus in response to the capability notification from the printing apparatus 101. Although the present embodiment describes a message according to the IPP protocol as an example, another protocol may be used instead.

The capability information 710 of the printing apparatus 101 includes "media-type-supported" information, which is an example of sheet type support information according to IPP. The supported sheet types are denoted on a case-by-case basis in 711 to 714. Case 1 (711) indicates an example in which the supported sheet types for the printing apparatus 101 are "auto (automatic settings)", "stationery", "stationery-lightweight", and "stationery-heavyweight". Case 2 (712) indicates an example in which the supported sheet types for the printing apparatus 101 are "stationery", "stationery-lightweight", and "stationery-heavyweight". Case 3 (713) indicates an example in which the supported sheet type of the printing apparatus 101 is only "stationery". Case 4 (714) indicates an example in which the printing apparatus 101 does not support sheet types, and thus "media-type-supported" itself is not included. 715 indicates information of sheets fed in a sheet feed cassette of the printing apparatus 101. It can be seen that the sheets fed in a sheet feed cassette "tray-1" have a sheet size of 210 mm×297 mm, and a sheet type of "stationery-lightweight" (thin paper). If the printing apparatus includes a plurality of sheet feed cassettes, information for each tray (each sheet feed cassette) is included.

The job tickets of the print jobs generated by the information processing apparatus in response to the capability notification from the printing apparatus 101 are denoted on a case-by-case basis in 721 to 723 of the job ticket 720. Case A (721) indicates an example in which "stationery" is designated as the sheet type in the job ticket. Case B (722) indicates an example in which "auto" is designated as the sheet type in the job ticket. Case C (723) indicates an example in which the job ticket of the print job includes no sheet type designation. The method for using this capability information, and the operations of the printing apparatus 101, will be described later.

Screen Examples

Figure 8:
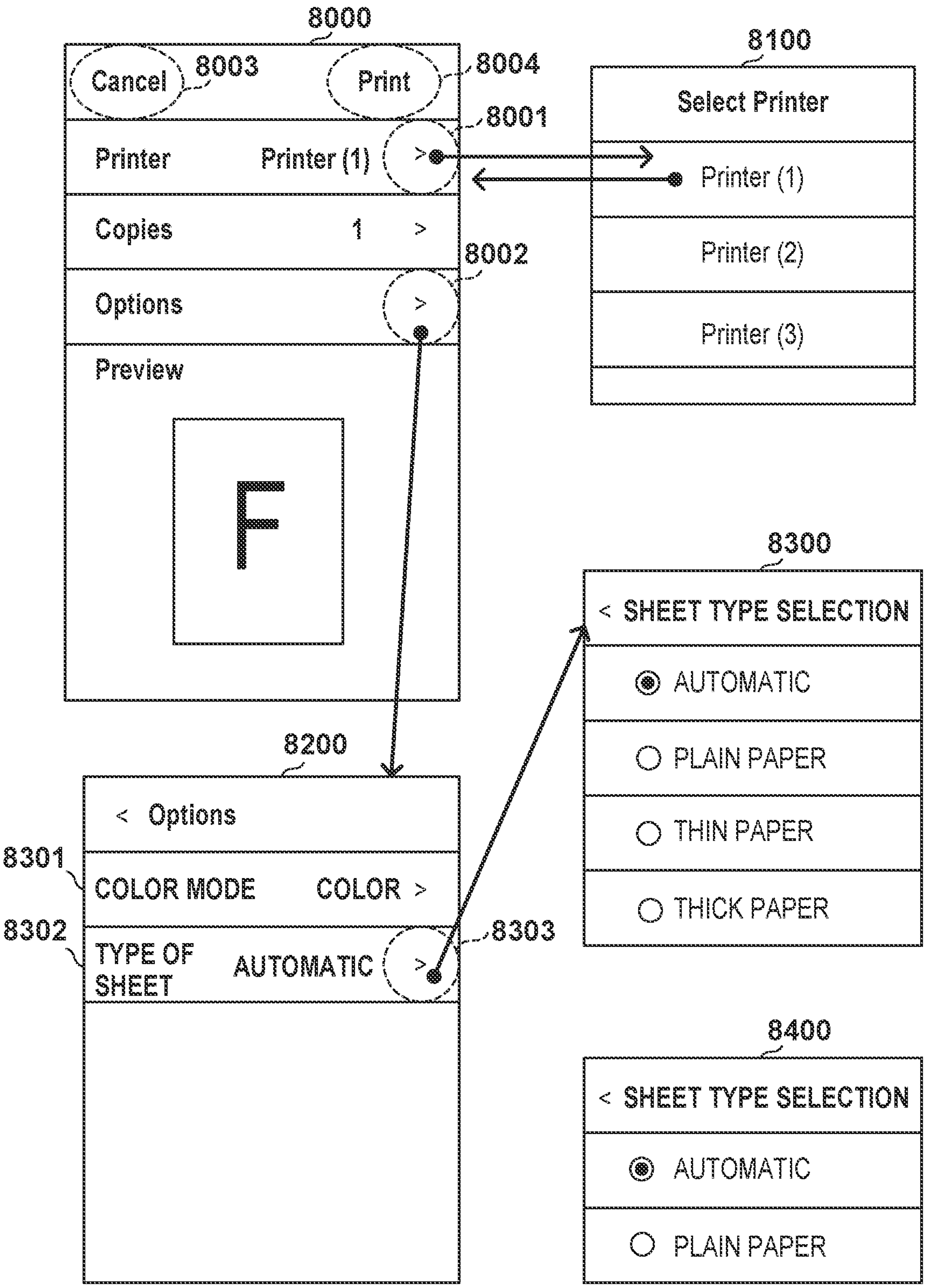
FIG. 8 is a diagram illustrating an example of a printing screen according to an embodiment.

An example of the printing settings screen displayed in the information processing apparatus 103 (the tablet) according to the present embodiment will be described next with reference to FIG. 8. The other information processing apparatuses such as the laptop PC 104 are not intended to be limited to the screen example described hereinafter, and the screen example described hereinafter can be changed as appropriate and applied in accordance with the display region of the display in the apparatus.

When the printing application 501 calls the printing function, a printing settings screen 8000 is displayed by the OS. As illustrated in FIG. 8, the printing settings screen 8000 is configured including a printing apparatus selection item, a number of copies selection item, and optional settings selection item, and a preview screen, for example. The user can select the printing apparatus to be used for the printing by selecting the part of the printing apparatus selection item indicated by 8001 to transition to a screen 8100. When the screen 8100 is displayed, the information processing apparatus searches the network for printing apparatuses, and displays only the printing apparatuses that have responded as a list in the screen 8100. The printing apparatus 101 selected by the user ("Printer(1)") is displayed in the printing apparatus selection item field. At this time, the information processing apparatus inquires with the printing apparatus 101 selected by the user as to the capability information of the printing apparatus 101, and generates a settings screen 8200 for printing options 8002 in accordance with the capability information returned by the printing apparatus 101. Note that the present invention is not limited thereto, and for example, the capability information may be received from one or more communication-capable printing apparatuses when the printing settings screen 8000 is displayed. This makes it possible to generate the settings screens with the various selection items in advance, which in turn makes it possible to realize a user-friendly system of operations.

The information processing apparatus displays the settings screen 8200 when printing options 8002 is selected by the user. Print setting items based on the capability information of the printing apparatus 101, and the values currently set, are displayed in the settings screen 8200. 8301 indicates that a color mode setting item is set to a value of "color", and 8302 indicates that a sheet type setting item is set to a value of "automatic". The setting values displayed in 8200 can be changed, and a sheet type selection screen 8300 is displayed in response to a setting change button 8303 being selected in order to change the setting value of sheet type 8302. Note that the content in the selection screen displayed here changes depending on the capability information received by the information processing apparatus from the printing apparatus 101.

Figures 12, 13:
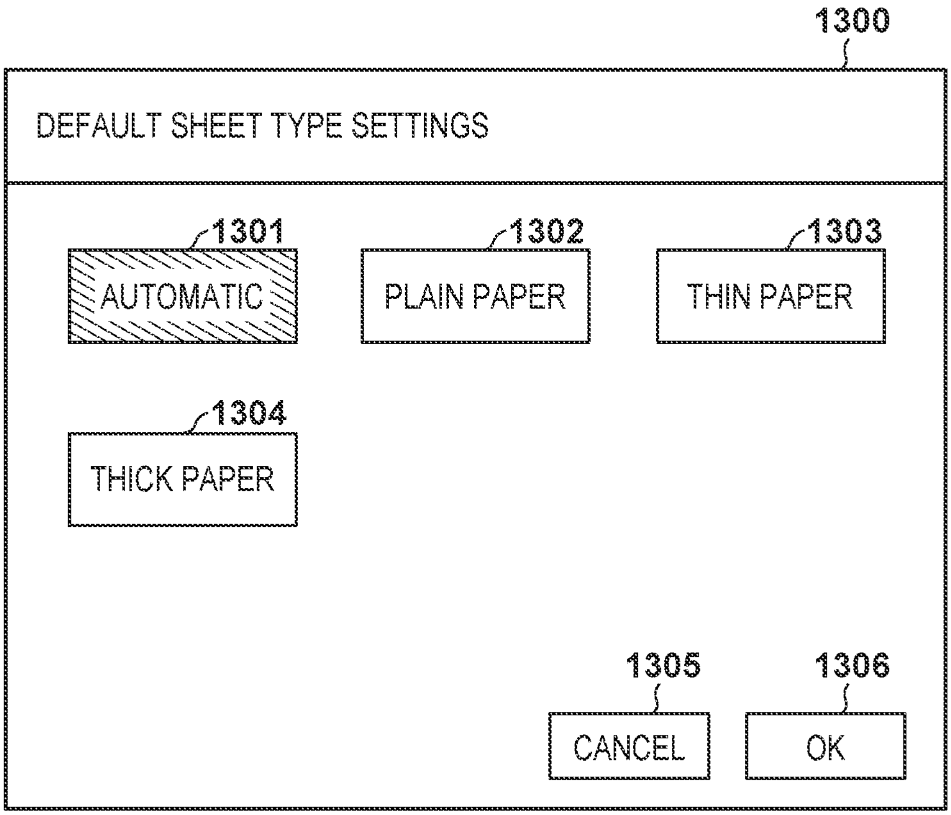
FIG. 12 is a table indicating the correspondence between sheet type display items and IPP according to an embodiment.
FIG. 13 is a diagram illustrating a default sheet type settings screen of a printing apparatus according to an embodiment.

In the selection screen 8300, the user can change the sheet type settings by selecting one of the displayed sheet type check boxes. The other sheet type selection screen 8400 indicates an example of a printing apparatus 101 that does not support thin paper or thick paper. FIG. 12 indicates mapping of the sheet type support information communicated using the capability information 710 of the printing apparatus 101, and sheet type names displayed in the sheet type selection screens 8300 and 8400 in accordance therewith. 1201 indicates values listed in the sheet type capability information "media-type-supported" communicated using the capability information 710, and 1202 indicates the sheet type names displayed in the sheet type selection screen 8300 in accordance with the communicated capability information. Specifically, the information processing apparatus displays "automatic" in the sheet type selection screen 8300 when "auto" has been communicated as the capability information, and displays "plain paper" in the selection screen 8300 when "stationery" has been communicated. "Thin paper" is displayed in the selection screen 8300 when "stationery-lightweight" has been communicated, and "thick paper" is displayed in the selection screen 8300 when "stationery-heavyweight" has been communicated.

Processing Sequence by Information Processing Apparatus

A processing sequence carried out by the information processing apparatus according to the present embodiment will be described next with reference to the flowchart in FIGS. 9A and 9B. This flowchart illustrates a process leading up to the information processing apparatus displaying the printing settings screen 8000 and sending a print job. Although the print setting items that can be changed are limited to the sheet type in the flowchart provided here, the configuration may be such that other print setting items can actually be changed. The processing described hereinafter is realized by, for example, the CPU 401 of the information processing apparatus reading out control programs, which are stored in the ROM 402 or the storage 404, into the RAM 403 and executing those programs.

In step S901, the CPU 401 of the information processing apparatus determines whether or not the part indicated by the aforementioned 8001, for selecting the printing apparatus, has been selected. If the stated part has been selected, the process moves to step S902, and if not, the process moves to step S907. In step S902, the CPU 401 inquires with the printing apparatus 101 which has been selected by the user through the screen 8100 for selecting the printing apparatus as to the capabilities of the printing apparatus 101. The capability inquiry is made using the IPP "Get-Printer-Attributes" request command, indicated by 700 in FIG. 7A-1. The information processing apparatus then receives the capability information from the printing apparatus 101 as a response to the inquiry made in step S902. This specifically is the IPP "Get-Printer-Attributes" response command indicated by 710 in FIG. 7A-1. The process then moves to step S903.

In step S903, the CPU 401 analyzes the received capability information of the printing apparatus 101. Then, in step S904, the CPU 401 determines whether or not the printing apparatus 101 supports sheet types, based on the analyzed capability information. Here, the determination as to whether or not sheet types are supported is made based on whether or not the capability information of the printing apparatus 101 includes "media-type-supported". "media-type-supported" is included if Case 1 (711) to Case 3 (713) indicated in FIG. 7A-3 have been received, and thus the printing apparatus 101 in question can be determined to support sheet types. However, "media-type-supported" is not included if Case 4 (714) has been received, and thus the printing apparatus 101 in question can be determined to not support sheet types. The process moves to step S905 if it is determined in step S904 that the printing apparatus 101 supports sheet types, and to step S907 if not.

Figure 10:
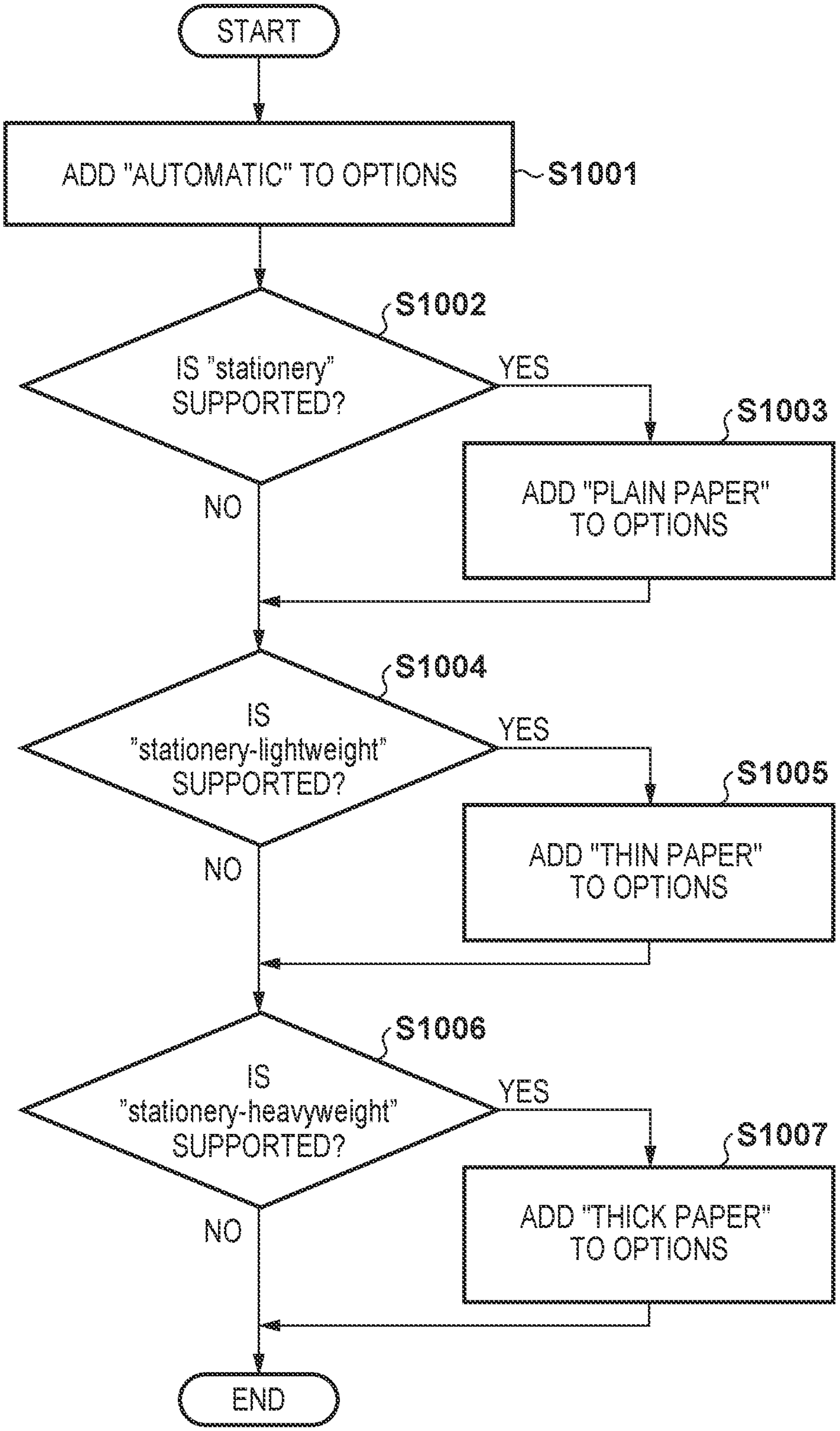
FIG. 10 is a flowchart for an information processing apparatus according to an embodiment.

In step S905, the CPU 401 adds a sheet type setting item 3802 to the settings screen 8200, and the process moves to step S906. In step S906, the CPU 401 generates a sheet type list in the sheet type selection screens (8300, 8400) displayed when the sheet type setting change button 8303 has been selected, after which the process moves to step S907. The items displayed in the sheet type list change depending on the capability information of the printing apparatus 101. The process of step S906 will be described in detail using the flowchart in FIG. 10. The processing described hereinafter is realized by, for example, the CPU 401 of the information processing apparatus reading out control programs, which are stored in the ROM 402 or the storage 404, into the RAM 403 and executing those programs.

In step S1001, the CPU 401 adds "automatic" to the selection screen 8300 for selecting the sheet type, and the process then moves to step S1002. In step S1002, the CPU 401 determines whether or not "stationery" is included in the "media-type-supported", which is included in the capability information 710 of the printing apparatus 101. The process moves to step S1003 if "stationery" is included, and to step S1004 if not; in step S1003, the CPU 401 adds "plain paper" to the selection screen 8300, and the process then moves to step S1004.

In step S1004, the CPU 401 determines whether or not "stationery-lightweight" is included in the "media-type-supported", which is included in the capability information 710 of the printing apparatus 101. If "stationery-lightweight" is included, the process moves to step S1005, and if not, the process moves to step S1006. In step S1005, the CPU 401 adds "thin paper" to the selection screen 8300, and the process then moves to step S1006.

In step S1006, the CPU 401 determines whether or not "stationery-heavyweight" is included in the "media-type-supported", which is included in the capability information 710 of the printing apparatus 101. If "stationery-heavyweight" is included, the process moves to step S1007, and if not, the process ends. In step S1007, the CPU 401 adds "thick paper" to the selection screen 8300, and the process then ends.

In this manner, the "automatic" selection item is always listed in the selection screen 8300 in addition to the supported sheet types listed using the capability information of the printing apparatus 101. In other words, the "automatic" selection item is set by default, regardless of whether or not the capability information includes information indicating "automatic". For example, the difference between the capability information 711 (Case 1) and 712 (Case 2) of the printing apparatus 101 indicated in FIGS. 7A-2 and 7A-3 is whether or not "auto" is included. However, the sheet type selection items displayed by the information processing apparatus when the capability information is received are both 8300, including "automatic". The sheet type selection items displayed in the information processing apparatus when the capability information 713 (Case 3) of the printing apparatus 101 is received are 8400, in which "automatic" and "plain paper" are displayed. Note that with Case 4 (714), "media-type-supported" is not present, and thus the sheet type settings item 8302 itself is not displayed. Once the capability information of the printing apparatus 101 is interpreted and the printing settings screen is displayed in this manner, the process returns to step S907.

The descriptions will now return to FIGS. 9A and 9B. In step S907, the CPU 401 determines whether or not the print setting item has been selected. If the item has been selected, the process moves to step S908, and if not, the process moves to step S909. In step S908, the CPU 401 displays a settings change screen based on the selected print setting item (e.g., 8301 or 8302) and changes to the input setting item, after which the process moves to step S909.

In step S909, the CPU 401 determines whether or not a print button 8004 has been selected. If the button has not been selected, the process moves to step S917, and if the button has been selected, the process moves to step S910. In step S910, the CPU 401 determines whether or not the sheet type setting item 8302 is supported by the print settings. If the printing apparatus 101 does not support sheet types, the process moves to step S915 without the sheet type setting item 8302 being displayed. If the sheet type settings are supported, the process moves to step S911.

In step S911, the CPU 401 determines whether or not the sheet type that is set is "automatic". The process moves to step S912 if the setting is "automatic", and to step S914 if not. In step S914, the CPU 401 sets a sheet type command corresponding to the selected sheet type in the job ticket, and the process then moves to step S915. The mapping between the sheet types and the commands is as illustrated in the aforementioned FIG. 12. For example, if "plain paper" has been selected, "stationery" is set in the job ticket, as indicated by Case A (721) in FIG. 7B.

However, in step S912, the CPU 401 determines whether or not the printing apparatus 101 supports "auto" in "media-type-supported". The process moves to step S913 if "auto" is supported, and to step S915 if not. In step S913, the CPU 401 designates "auto" in the job ticket (Case B (722)), and the process then moves to step S915. If "auto" is not supported, the process moves to step S915 with no sheet type designation being made in the job ticket (Case C (723)).

Thus according to the present embodiment, "automatic" is always displayed in the sheet type selection screen regardless of whether or not the printing apparatus 101 supports "auto" in "media-type-supported". As a result, even a printing apparatus 101 that does not support "auto" can generate a job without a sheet type specified.

Next, in step S915, the CPU 401 applies settings aside from the sheet type to the job ticket. Then, in step S916, the CPU 401 sends the print job to the printing apparatus 101, and the process ends. On the other hand, in step S917, the CPU 401 determines whether or not a cancel button 8003 has been selected; the process returns to step S901 if the button has not been selected, whereas the flowchart ends if the button has been selected.

Processing Sequence by Printing Apparatus

Figure 11:
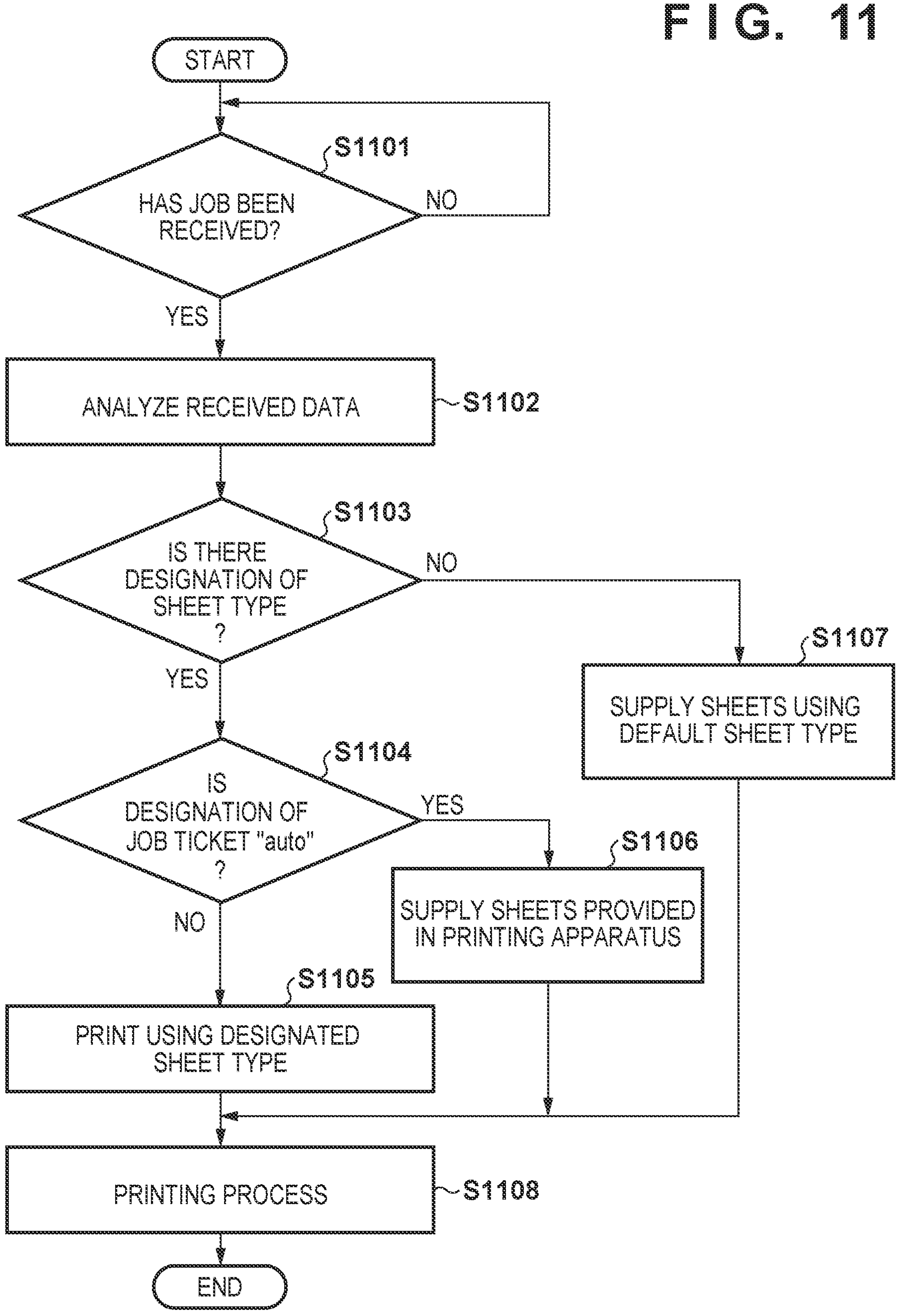
FIG. 11 is a flowchart for a printing apparatus according to an embodiment.

A processing sequence carried out by the printing apparatus 101 according to the present embodiment will be described next with reference to the flowchart in FIG. 11. This flowchart illustrates a process carried out when the printing apparatus 101 receives a print job. Although the print settings are limited to the sheet type in the flowchart provided here, the configuration may be such that other processes are actually included. The processing described hereinafter is realized by, for example, the CPU 211 of the printing apparatus 101 reading out control programs, which are stored in the ROM 212 or the storage 214, into the RAM 213 and executing those programs.

In step S1101, the CPU 211 of the printing apparatus 101 determines whether or not a print job has been received from an external device. The process moves to step S1102 if a job has been received. In step S1102, the CPU 211 analyzes the received print data. Then, in step S1103, the CPU 211 determines whether or not there are sheet type settings. The process moves to step S1104 if there are sheet type settings, and to step S1107 if not.

In step S1104, the CPU 211 determines whether or not the sheet type set in the job ticket is "auto". If the sheet type is not "auto", the process moves to step S1105, where the CPU 211 determines to print using the designated sheet type, after which the process moves to step S1108. For example, if "stationery" is designated as indicated by Case A (721) in FIG. 7B, the printing is carried out using plain paper. On the other hand, if in step S1104 "auto" is designated, as indicated by Case A (722) in FIG. 7B, for example, the process moves to step S1106, where the CPU 211 determines to print using sheets fed in a cassette, regardless of the sheet type; the process then moves to step S1108. In step S1106, the cassette in which the sheets used in printing are fed is a cassette set in advance. For example, the cassette set in advance may be a cassette set by the user. If no sheets are fed in the cassette set in advance, the printing apparatus may carry out the printing using sheets fed in a different cassette from the cassette set in advance.

However, if there is no sheet type designation in the job ticket in step S1103, the process moves to step S1107, where the CPU 211 determines to supply sheets using the default sheet type; the process then moves to step S1108. The "default sheet type" is a value referred to when there is no sheet type setting in the job ticket, and is set in the printing apparatus 101 in advance. The default sheet type can be set through user inputs made via the operation unit 216 of the printing apparatus 101, and FIG. 13 illustrates an example of a screen for that purpose. In a default sheet type settings screen 1300, automatic 1301, plain paper 1302, thin paper 1303, and thick paper 1304 can be designated as default values for the sheet type settings. In the example illustrated in FIG. 13, "automatic" is set as the default sheet type, and thus the resulting operation is one in which printing is carried out using the sheets fed in a sheet cassette, in the same manner as if "auto" was designated in the job ticket.

In step S1108, the CPU 211 executes a printing process using the supplied sheet, and the flowchart then ends.

As described thus far, the information processing apparatus according to the present embodiment obtains the capability information of a printing apparatus capable of communication. Then, based on the obtained capability information, the information processing apparatus generates and displays a printing settings screen for predetermined printing items pertaining to the corresponding printing apparatus, the screen including selection items in which automatic settings can be selected regardless of whether or not the corresponding printing apparatus is capable of automatic settings. Additionally, the information processing apparatus generates print data of a print job to which the content of the settings set through the printing settings screen has been applied, and sends the generated print data to the corresponding printing apparatus. Thus according to the present embodiment, the information processing apparatus displays the sheet type selection items in accordance with the capability information of the printing apparatus 101. If "automatic" is selected, "auto" is designated in the job ticket, and the printing is carried out using the sheets fed in the printing apparatus 101. On the other hand, even if the printing apparatus 101 does not support "auto (automatic settings)", not designating the sheet type in the job ticket makes it possible to print using the default sheet size of the printing apparatus. Printing can therefore be carried out using the sheet fed in the printing apparatus 101, by designating "auto" for the default sheet setting in advance.

Note that the present invention is not limited to the foregoing embodiment, and many variations are possible. For example, the foregoing embodiment describes control pertaining to the sheet type as the item in the print settings. However, the present invention can be applied to a variety of setting items that can be included in automatic settings, as long as they are print setting items. Such print setting items include "sheet size", "collective printing", "print orientation", "destination", "print quality", "finishing processes", and the like, for example. This variation also applies to the second embodiment, which will be described hereinafter.

Second Embodiment

A second embodiment of the present invention will be described below. The foregoing first embodiment describes control in which sheet type options are displayed in the selection screen 8300 for selecting the sheet type, and printing is carried out using the sheets fed in the printing apparatus 101.

If printing is carried out having selected "automatic" in the printing apparatus 101, the printing will be carried out using the default sheet type set in the printing apparatus 101. However, if the default sheet type is set to something aside from "auto", a print error may arise due to the mismatch with the type of sheet fed in the cassette. For example, there are situations where the default sheet type is "plain paper" but the type of the sheet fed in the cassette is "thin paper". The present embodiment will describe processing for handling problems such as this, in which the default value for settings is switched in accordance with the type of sheet fed in the printing apparatus 101 in the process by which an information processing apparatus generates a sheet selection screen.

Sheet Selection Screen Generation

Figure 14:
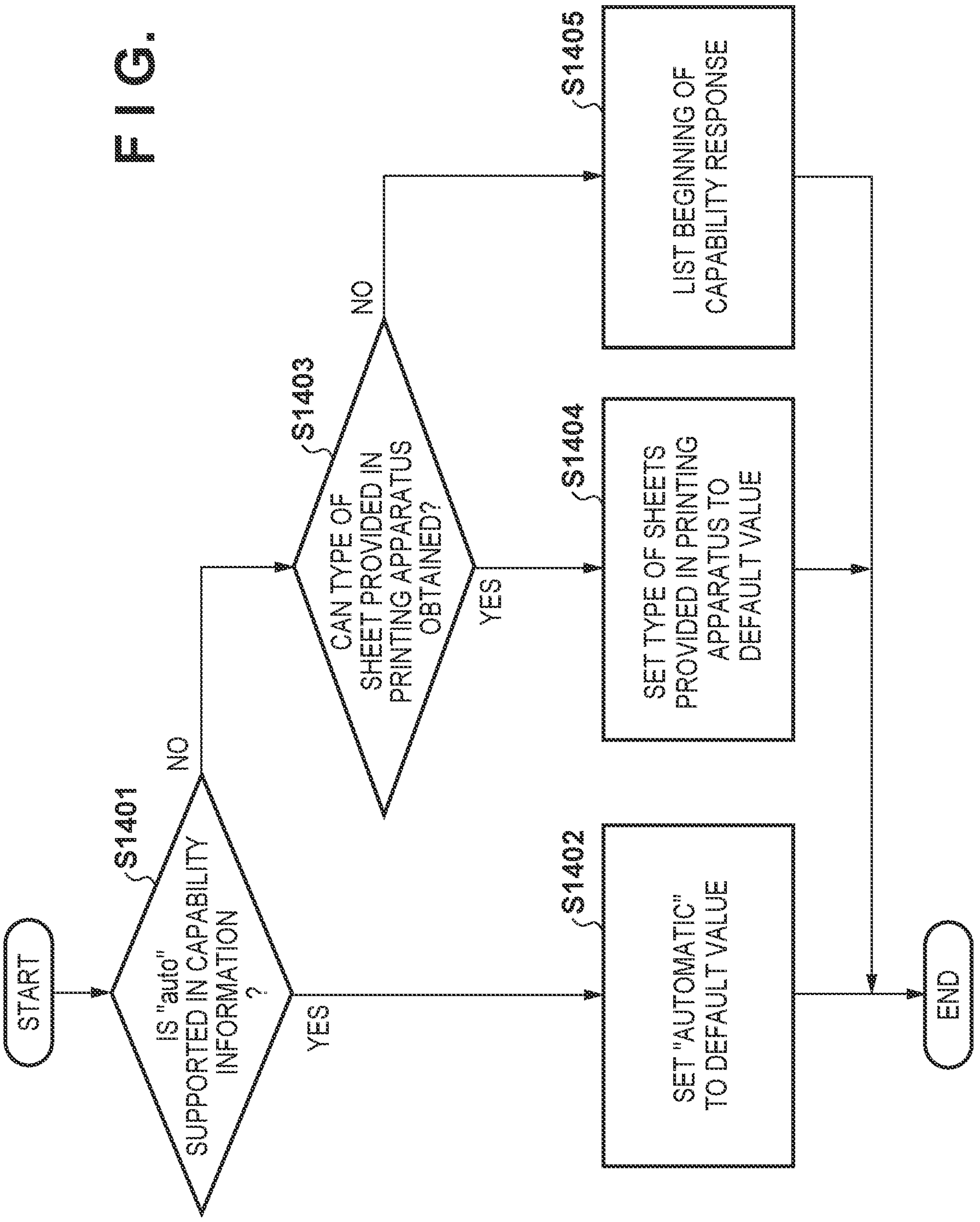
FIG. 14 is a flowchart for an information processing apparatus according to an embodiment.

Additional processing, according to the present embodiment, in the process for generating the sheet selection screen, carried out by the information processing apparatus in step S906 of FIG. 9A, will be described with reference to FIG. 14. This flowchart is executed after the flowchart illustrated in FIG. 10. Note that aside from the process of step S906, the processing according to the present embodiment is the same as the processing described in the first embodiment, and will therefore not be described. The processing described hereinafter is realized by, for example, the CPU 401 of the information processing apparatus reading out control programs, which are stored in the ROM 402 or the storage 404, into the RAM 403 and executing those programs.

Figure 15:
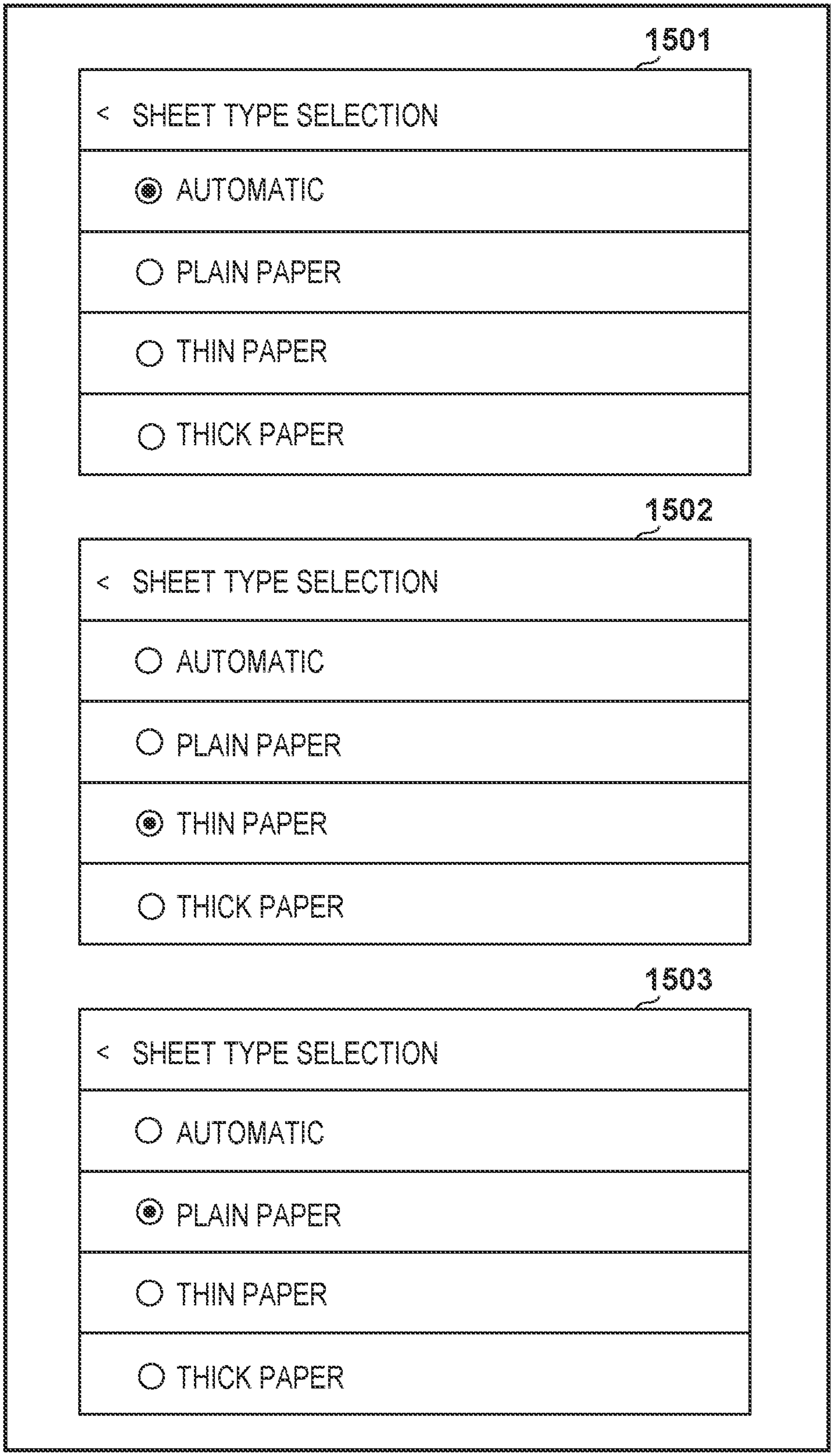
FIG. 15 is a diagram illustrating an example of a printing screen according to an embodiment.

In step S1401, the CPU 401 of the information processing apparatus determines whether or not the printing apparatus 101 supports "auto". If "auto" is supported, the process moves to step S1402, where the CPU 401 sets the default value in the screen for selecting the sheet type to "automatic", after which the process ends. 1501 in FIG. 15 indicates the sheet type selection screen in this case. It can be seen that the default value is "automatic".

On the other hand, if it is determined in step S1401 that "auto" is not supported, the process moves to step S1403. In step S1403, the CPU 401 determines whether or not the type of sheet fed in the printing apparatus 101 can be obtained. This is done by determining whether or not the printing apparatus supports the "media-col-ready" capability information for the sheet feed cassette, according to IPP. If "media-col-ready" is supported, the process moves to step S1404, where the CPU 401 checks the type of the sheets fed in the sheet feed cassette and sets the default value to that sheet type, after which the process ends. From the "media-col-ready" indicated by 715 in FIG. 7A-3, it can be seen that "stationery-lightweight" (thin paper) is fed in the sheet feed cassette, and thus the default value in the sheet type selection screen is set to thin paper. 1502 in FIG. 15 indicates the sheet type selection screen in this case.

On the other hand, if it is determined in step S1403 that the type of the sheets fed in the printing apparatus 101 cannot be obtained, the process moves to step S1405. In step S1405, the CPU 401 sets the sheet type listed at the beginning of "media-type-supported", obtained from the capability information of the printing apparatus 101, to the default for the sheet type selection screen. If the capability information for Case 1 (711) in FIG. 7A-2 has been received, "auto" is at the start of the list, and thus the default value is set to "automatic" (1501 in FIG. 15). However, if the capability information for Case 2 (712) in FIG. 7A-3 has been received, "stationery" is at the start of the list, and thus the default value is set to "plain paper" (1503 in FIG. 15).

As described thus far, the information processing apparatus according to the present embodiment switches the default value of a predetermined printing item displayed in the printing settings screen in accordance with the capability information obtained from the printing apparatus. Because the information processing apparatus switches the default value in the sheet selection screen in accordance with the capability information of the printing apparatus in this manner, the likelihood of mismatches between the print job and the type of sheets fed in the sheet feed cassette can be reduced. Predetermined print setting items can therefore be set appropriately, and the print data of the print job can be generated, regardless of the capabilities of the printing apparatus.

Third Embodiment

A third embodiment of the present invention will be described below. Items that are the same as in the foregoing first and second embodiments will not be described. Although the foregoing first embodiment described an example in which options that always include "automatic" are displayed regardless of whether or not the printing apparatus supports "auto", the present embodiment will describe control in which the option for "automatic" is not displayed when the capability information does not include "auto". In other words, in the present embodiment, the options are displayed in accordance with the capability information of the printing apparatus. Thus according to the control of the present embodiment, the "automatic" field is not added to 8400 in FIGS. 8 and 1502 and 1503 in FIG. 15.

Screen Examples

Screen examples according to the present embodiment will be described using FIG. 8. Note that only areas that differ from the first embodiment will be described. The selection screen 8300 is a screen displayed in the touch panel 408 of the information processing apparatus 103 or 104 when "media-type-supported" included in the capability information 710 is as indicated in 711 of FIGS. 7A-1 and 7A-2. According to 711, "auto", "stationery", "stationery-lightweight", and "stationery-heavyweight" are supported. As such, "automatic", "plain paper", "thin paper", and "thick paper", which correspond to that attribute information, are displayed in the selection screen 8300. In the selection screen 8300, the user can change the sheet type settings by selecting one of the displayed sheet type objects. The selection screen 8300 is for selecting a single sheet type, and a plurality of sheet types cannot be selected. The other sheet type selection screen 8400 is a screen displayed in the touch panel 408 of the information processing apparatus 103 or 104 when "media-type-supported" included in the capability information 710 is as indicated in 713 of FIG. 7A-3. According to 713, only "stationery" is supported, and thus only "plain paper" is displayed in the selection screen 8400. FIG. 12 indicates mapping of the sheet type support information communicated using the capability information 710 of the printing apparatus 101, and sheet type names displayed in the sheet type selection screens 8300 and 8400 in accordance therewith. 1201 indicates values listed in the sheet type capability information "media-type-supported" communicated using the capability information 710, and 1202 indicates the sheet type names displayed in the sheet type selection screen 8300 in accordance with the communicated capability information. Specifically, the information processing apparatus displays "automatic" in the sheet type selection screen 8300 when “auto” has been communicated as the capability information, and displays “plain paper” in the selection screen 8300 when “stationery” has been communicated. “Thin paper” is displayed in the selection screen 8300 when “stationery-lightweight” has been communicated, and “thick paper” is displayed in the selection screen 8300 when “stationery-heavyweight” has been communicated.

Processing Sequence by Information Processing Apparatus

Figure 16A:
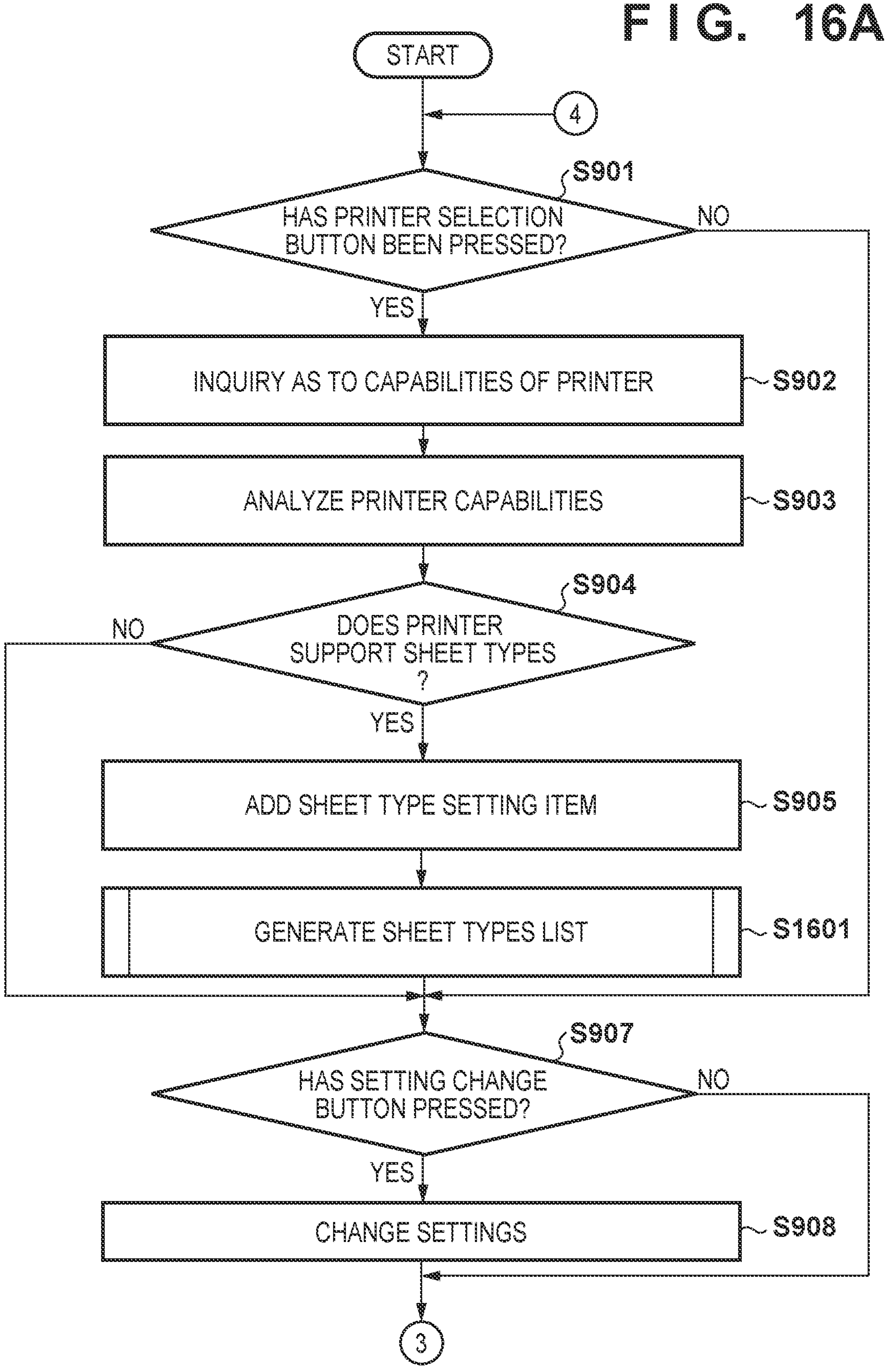
FIGS. 16A and 16B are a flowchart for an information processing apparatus according to an embodiment.
Figure 16B:
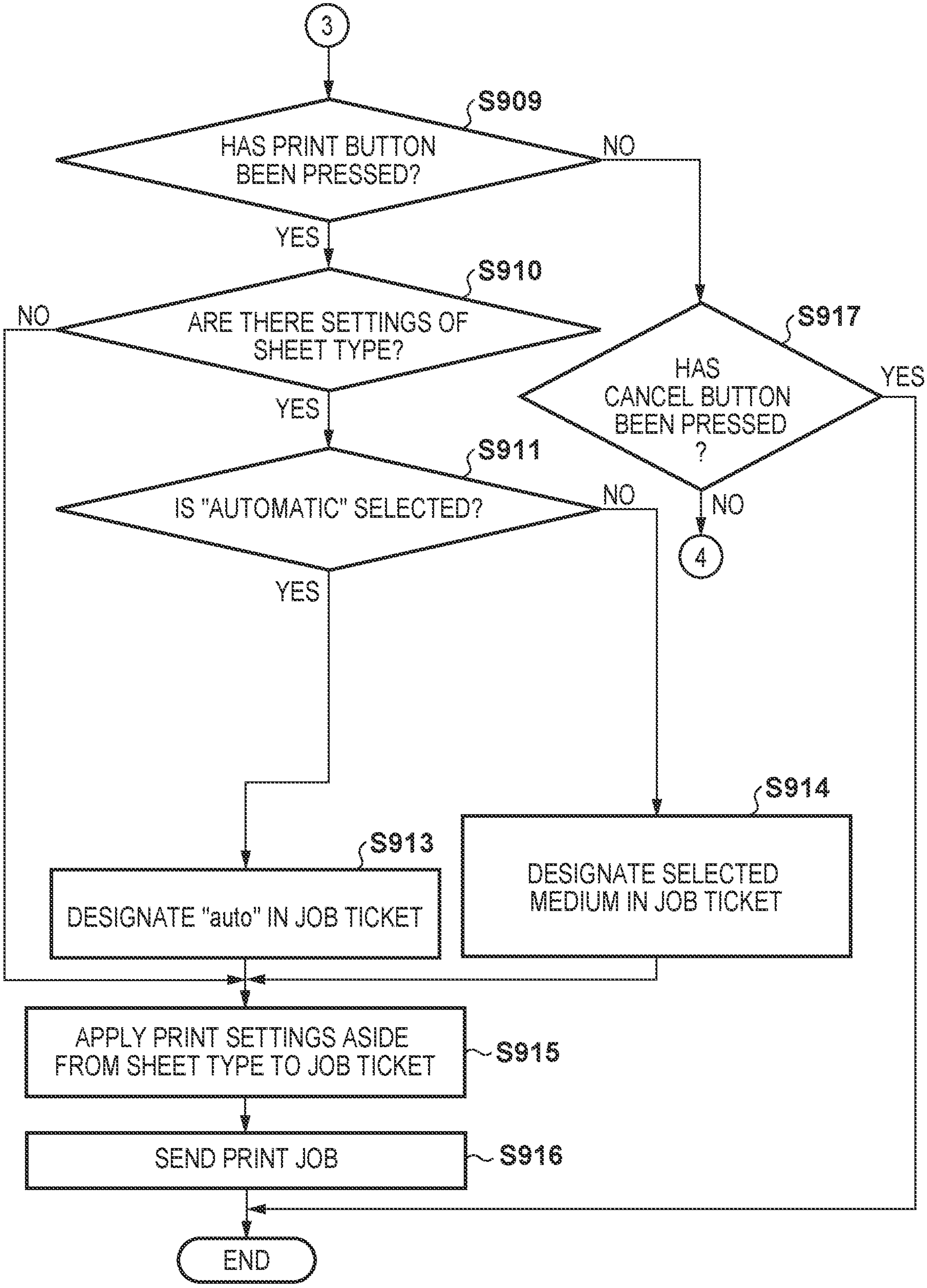

A processing sequence carried out by the information processing apparatus according to the present embodiment will be described first with reference to the flowchart in FIGS. 16A and 16B. This flowchart illustrates a process leading up to the information processing apparatus displaying the printing settings screen 8000 and sending a print job. Although the print setting items that can be changed are limited to the sheet type in the flowchart provided here, the configuration may be such that other print setting items can actually be changed. The processing described hereinafter is realized by, for example, the CPU 401 of the information processing apparatus reading out control programs, which are stored in the ROM 402 or the storage 404, into the RAM 403 and executing those programs.

Figure 9A:
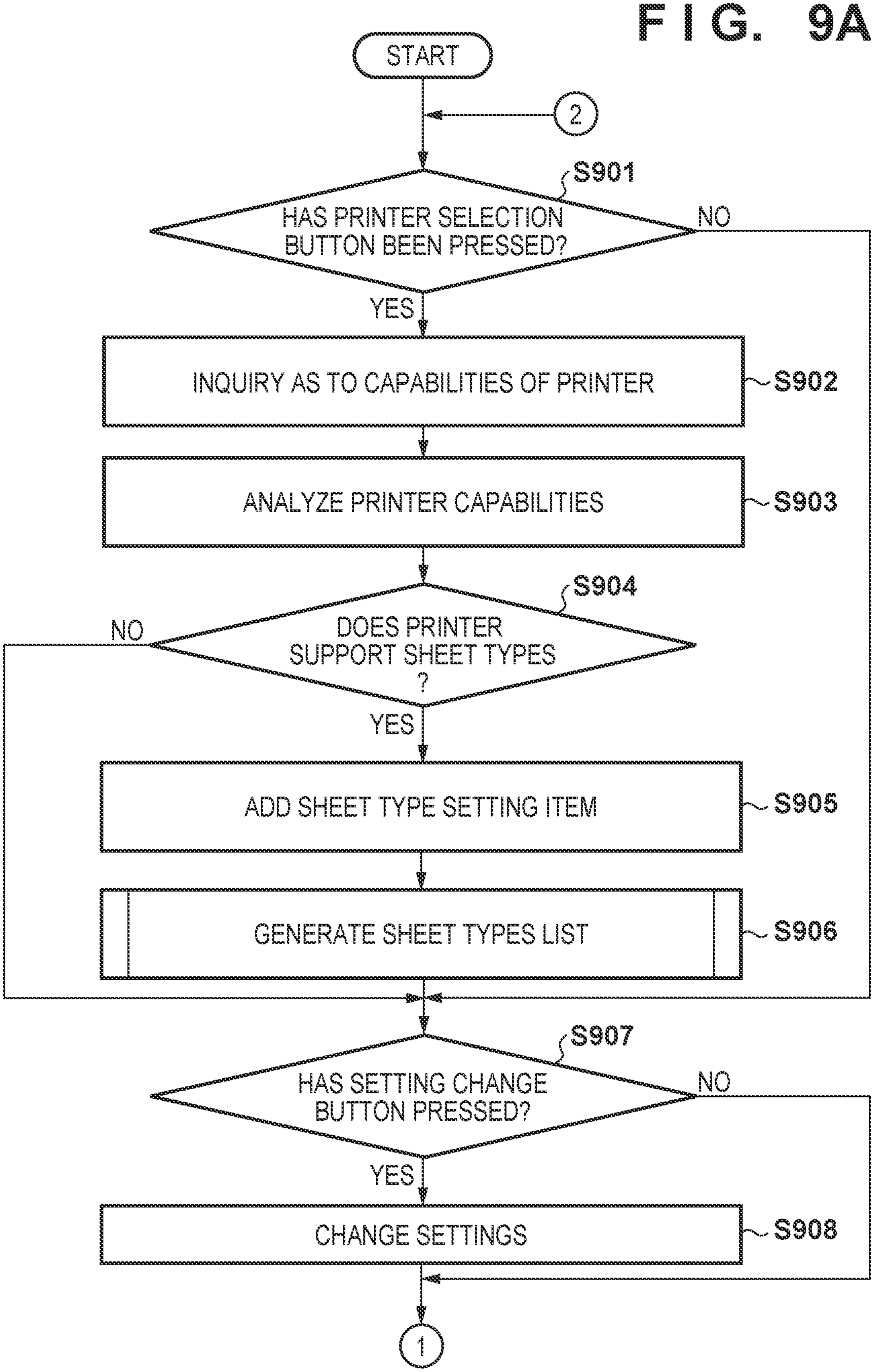
FIGS. 9A and 9B are flowcharts for an information processing apparatus according to an embodiment.
Figure 9B:
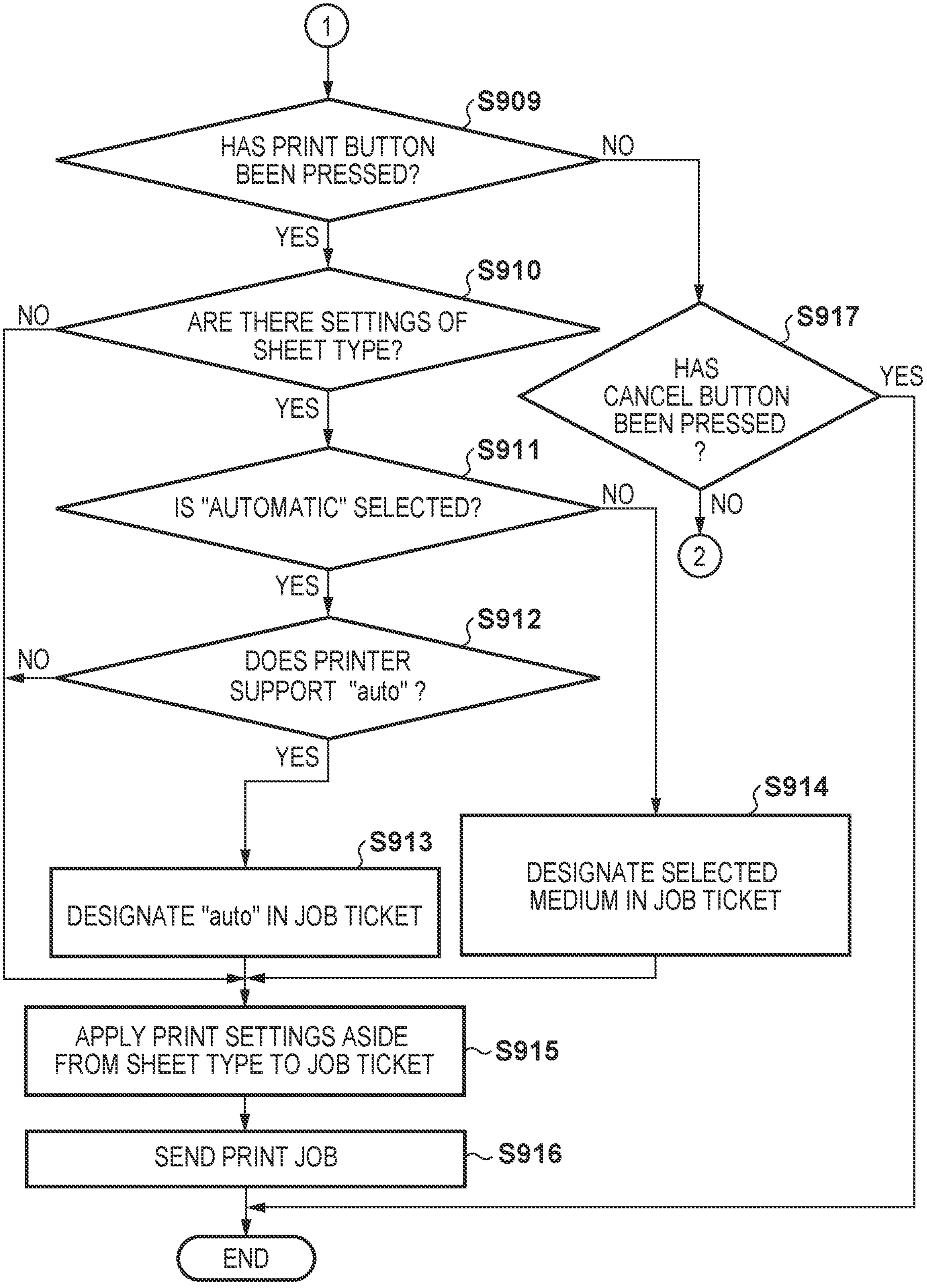

This flowchart is different from the flowchart in FIGS. 9A and 9B in that step S906 has been replaced with the process of step S1601, and the process of step S912 has been removed. The following descriptions will focus on these differences.

Figure 17:
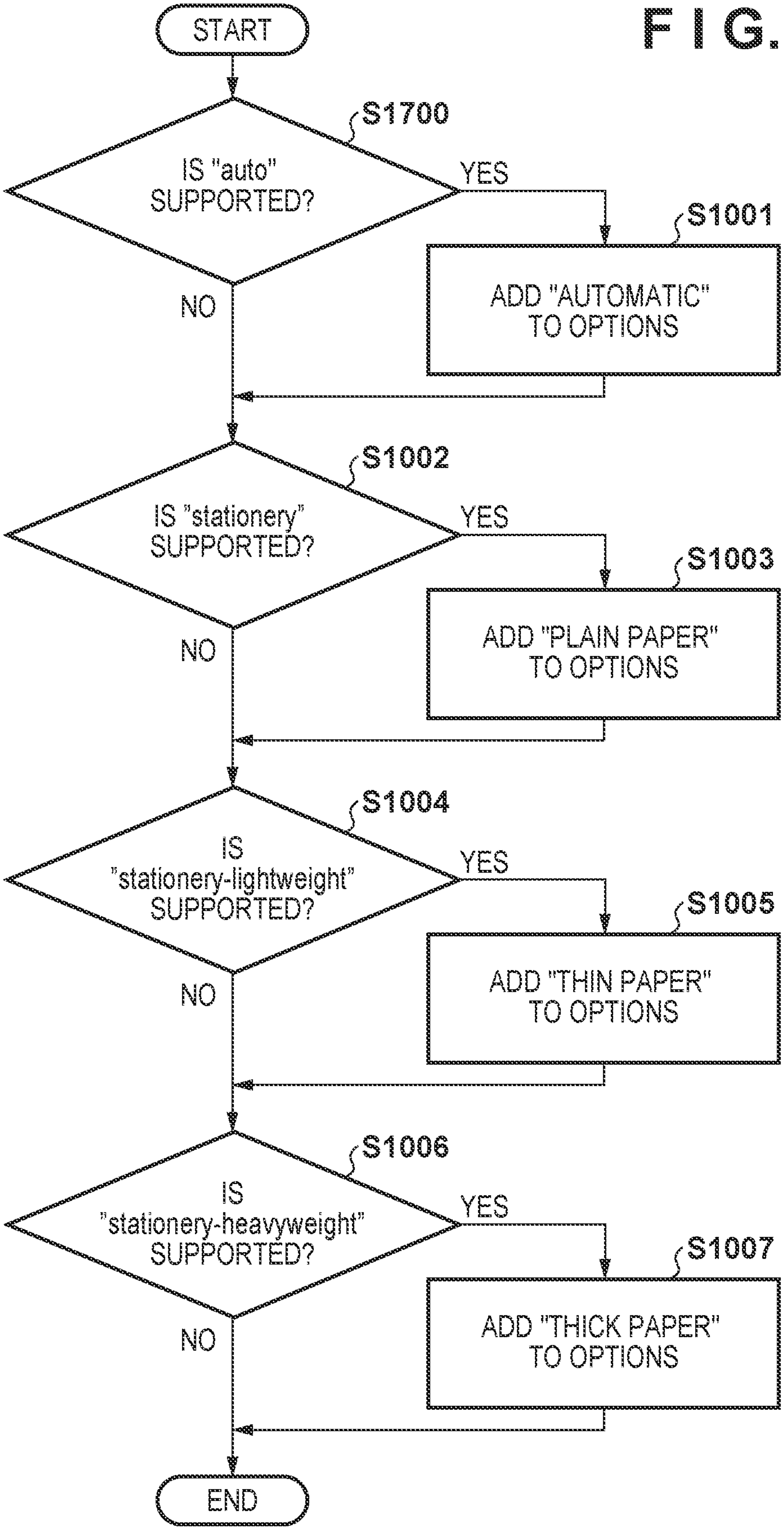
FIG. 17 is a flowchart for an information processing apparatus according to an embodiment.

In step S905, the CPU 401 adds the sheet type setting item 3802 to the settings screen 8200, and the process moves to step S1601. In step S1601, the CPU 401 generates a sheet type list in the sheet type selection screens (8300, 8400) displayed when the sheet type setting change button 8303 has been selected, after which the process moves to step S907. The items displayed in the sheet type list change depending on the capability information of the printing apparatus 101. The process of step S1601 will be described in detail using the flowchart in FIG. 17. The processing described hereinafter is realized by, for example, the CPU 401 of the information processing apparatus reading out control programs, which are stored in the ROM 402 or the storage 404, into the RAM 403 and executing those programs. Note that the descriptions given here will focus on the differences from the flowchart illustrated in FIG. 10.

In step S1700, the CPU 401 determines whether or not “auto” is included in “media-type-supported”, which is included in the capability information 710 of the printing apparatus 101. The process of step S1001 is executed if “auto” is included in the capability information, and the process of step S1002 is executed if not. In step S1001, the CPU 401 adds “automatic” to the selection screen 8300, and the process then moves to step S1002. The following processes are the same as those described with reference to FIG. 10, and will therefore not be described here.

In this manner, the supported sheet types according to the capability information of the printing apparatus 101 are listed in the selection screen 8300. For example, the difference between the capability information 711 (Case 1) and 712 (Case 2) of the printing apparatus 101 indicated in FIGS. 7A-2 and 7A-3 is whether or not “auto” is included. The sheet type selection items displayed by the information processing apparatus when the capability information 711 (Case 1), which includes “auto”, is received, are 8300, including “automatic”. The sheet type selection items displayed by the information processing apparatus when the capability information 712 (Case 2), which does not include “auto”, is received, do not include “automatic”. The sheet type selection items displayed in the information processing apparatus when the capability information 713 (Case 3) of the printing apparatus 101 is received are 8400, in which “plain paper” is displayed. Note that with Case 4 (714), “media-type-supported” is not present, and thus the sheet type settings item 8302 itself is not displayed. Once the capability information of the printing apparatus 101 is interpreted and the printing settings screen is displayed in this manner, the process returns to step S907.

The descriptions will now return to FIGS. 9A and 9B. The processing from steps S907 to S910 is the same as that described with reference to FIGS. 9A and 9B, and will therefore not be described here.

In step S911, the CPU 401 determines whether or not the sheet type that is set is “automatic”. The process moves to step S913 if the setting is “automatic”, and to step S914 if not. In step S914, the CPU 401 sets a sheet type command corresponding to the selected sheet type in the job ticket, and the process then moves to step S915. The mapping between the sheet types and the commands is as illustrated in the aforementioned FIG. 12. For example, if “plain paper” has been selected, “stationery” is set in the job ticket, as indicated by Case A (721) in FIG. 7B.

However, if “automatic” is selected in step S911, the CPU 401 designates “auto” in the job ticket in step S913 (Case B (722)), after which the process moves to step S915. The subsequent processes are the same as in FIGS. 9A and 9B, and will therefore not be described.

As described thus far, the information processing apparatus according to the present embodiment obtains the capability information of a printing apparatus capable of communication. Then, based on the obtained capability information, the information processing apparatus can change whether or not to display a button for selecting “automatic”, for a predetermined printing item pertaining to the corresponding printing apparatus. Doing so makes it possible for the user to set “automatic” when the printing apparatus is capable of executing a process corresponding to “automatic”. On the other hand, if the printing apparatus 101 cannot execute a process corresponding to “automatic”, a situation where the user selects “automatic” and causes an error can be prevented. Thus according to the present invention, predetermined print setting items can be set appropriately, and the print data of the print job can be generated, regardless of the capabilities of the printing apparatus.

Additionally, the information processing apparatus generates print data of a print job to which the content of the settings set through the printing settings screen has been applied, and sends the generated print data to the corresponding printing apparatus. Thus according to the present embodiment, the information processing apparatus displays the sheet type selection items in accordance with the capability information of the printing apparatus 101. If “automatic” is selected, “auto” is designated in the job ticket, and the printing is carried out using the sheets fed in the printing apparatus 101. On the other hand, even if the printing apparatus 101 does not support “auto (automatic settings)”, not designating the sheet type in the job ticket makes it possible to print using the default sheet size of the printing apparatus. Printing can therefore be carried out using the sheet fed in the printing apparatus 101, by designating “auto” for the default sheet setting in advance.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-009775 filed on Jan. 23, 2019 and Japanese Patent Application No. 2019-169244 filed on Sep. 18, 2019, which are hereby incorporated by reference herein in their entirety.

What is claimed is:

1. An information processing apparatus comprising:

a memory device that stores a set of instructions; and at east one processor that executes the set of instructions to:

obtain capability information of a printing apparatus, wherein the capability information includes a predetermined string and one or more media types that the printing apparatus can use in printing;

display, based on the obtained capability information including the predetermined string and the one or more media types, an option where a user does not designate a media type to be used in printing by the printing apparatus and the one or more media types;

generate a print job based on selection by a user from among the option and the one or more media types; and send the generated print job to the printing apparatus, wherein based on other capability information that does not include the predetermined string and includes the one or more media types obtained from another printing apparatus, the one or more media types are displayed and the option is not displayed.

2. The information processing apparatus according to claim 1, wherein the option is an option for the printing apparatus to select a media type to be used in printing automatically.

3. The information processing apparatus according to claim 1, wherein the at least one processor executes instructions in the memory device to:

generate, in a case where a media type has been selected from the one or more media types included in the capability information, a print job including data indicating the media type corresponding to the selected media type.

4. The information processing apparatus according to claim 1, wherein the one or more media types included in the capability information includes any one of plain paper, thick paper, and thin paper.

5. The information processing apparatus according to claim 4, wherein the one or more media types fed in the printing apparatus can be obtained from the capability information; and the at least one processor executes instructions in the memory device to:

display one of the one or more media types as a default.

6. The information processing apparatus according to claim 5, wherein the at least one processor executes instructions in the memory device to:

display, in a case where the capability information does not include the one or more media types of media fed to an image forming apparatus, the one or media types denoted first among the media types included in the capability information as a default.

7. The information processing apparatus according to claim 1, wherein the option and the one or more media type are displayed in a screen, and wherein the option is selected as a default in the displayed screen.

8. The information processing apparatus according to claim 1, wherein the at least one processor executes instructions in the memory device to:

send the print job to the printing apparatus in accordance with the Internet Printing Protocol (IPP).

9. The information processing apparatus according to claim 1, wherein the predetermined string included in the capability information is "Auto".

10. The information processing apparatus according to claim 1 wherein the at least one processor receives a user operation for selecting one from among the option and the one or more media types and generates the print job based on the selection by the received user operation.

11. A control method for an information processing apparatus, the method comprising:

obtaining capability information of a printing apparatus, wherein the capability information includes a predetermined string and one or more media types that the printing apparatus can use in printing;

displaying, based on the obtained capability information including the predetermined string and the one or more media types, an option where a user does not designate a media type to be used in printing by the printing apparatus and the one or more media types;

generating a print job based on selection by a user from among the option and the one or more media types; and sending the print job generated in the generating to the printing apparatus, wherein based on other capability information that does not include the predetermined string and includes the one or more media types obtained from another printing apparatus, the one or more media types are displayed and the option is not displayed.

12. A non-transitory computer-readable storage medium storing a program for causing a computer to execute each step of a control method for an information processing apparatus, the control method comprising:

obtaining capability information of a printing apparatus, wherein the capability information includes a predetermined string and one or more media types that the printing apparatus can use in printing;

displaying, based on the obtained capability information including the predetermined string and the one or more media types, an option where a user does not designate a media type to be used in printing by the printing apparatus and the one or more media types;

generating a print job based on selection by a user from among the option and the one or more media types; and sending the print job generated in the generating to the printing apparatus, wherein based on other capability information that does not include the predetermined string and includes the one or more media types obtained from another printing apparatus, the one or more media types are displayed and the option is not displayed.

13. An image forming apparatus comprising:

one or more cassettes configured to store media;

at least one memory device that stores a set of instructions; and at least one processor that executes the set of instructions to:

receive a request from an information processing apparatus;

transmit a predetermined string and one or more media types to the information processing apparatus that has transmitted the request;

receive a print job including data corresponding to the predetermined string; and select a cassette from the one or more cassettes regardless of a media type of media stored in the one or more cassettes.

14. The image forming apparatus according to claim 13, wherein the at least one processor executes the set of instructions in the memory device to:

receive a print job including a media type selected from the one or more media types that have been transmitted to the information processing apparatus; and select a cassette from the one or more cassettes based on the media type included in the received print job.

15. The image forming apparatus according to claim 13, wherein the media stored in the selected cassette is to be used for executing a process based on the received print job.

16. The image forming apparatus according to claim 13, wherein the at least one processor selects a predetermined cassettes to be used for printing based on the received print job.

17. The image forming apparatus according to claim 16, wherein the at least one processor selects another cassette in a case that the predetermined cassettes is empty.

* * * * *